United States Patent
Nishimura et al.

(10) Patent No.: US 9,967,895 B2
(45) Date of Patent: May 8, 2018

(54) WIRELESS TRANSMISSION SYSTEM

(71) Applicant: HITACHI, LTD., Tokyo (JP)

(72) Inventors: Haruki Nishimura, Tokyo (JP); Ryosuke Fujiwara, Tokyo (JP); Makoto Katagishi, Tokyo (JP); Masayuki Miyazaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 124 days.

(21) Appl. No.: 14/445,517

(22) Filed: Jul. 29, 2014

(65) Prior Publication Data

US 2015/0036619 A1 Feb. 5, 2015

(30) Foreign Application Priority Data

Aug. 1, 2013 (JP) .................................. 2013-160526

(51) Int. Cl.
  *H04W 4/00* (2009.01)
  *H04W 72/12* (2009.01)
  *H04W 68/00* (2009.01)

(52) U.S. Cl.
  CPC ........... *H04W 72/12* (2013.01); *H04W 68/00* (2013.01)

(58) Field of Classification Search
  CPC .............................. H04W 68/00; H04W 72/12
  See application file for complete search history.

(56) References Cited

U.S. PATENT DOCUMENTS

| | | | |
|---|---|---|---|
| 6,980,810 B1* | 12/2005 | Gerakoulis | ........... H04W 92/02 342/386 |
| 2002/0071449 A1* | 6/2002 | Ho | ........................ H04L 12/403 370/447 |
| 2002/0163933 A1* | 11/2002 | Benveniste | ............. H04L 47/10 370/465 |

(Continued)

FOREIGN PATENT DOCUMENTS

| | | |
|---|---|---|
| JP | 11-205346 A | 7/1999 |
| JP | 2005-65164 A | 3/2005 |

(Continued)

OTHER PUBLICATIONS

Japanese Office Action received in corresponding Japanese Application No. 2013-160526 dated Nov. 1, 2016.

*Primary Examiner* — Gregory Sefcheck
*Assistant Examiner* — Jael Ulysse
(74) *Attorney, Agent, or Firm* — Mattingly & Malur, PC

(57) ABSTRACT

Provided is a wireless transmission system including a plurality of access points and an access controller. The access controller determines a start standard time for a polling period for the plurality of access points to perform polling communication with a plurality of wireless terminals. The access controller generates a scheduling setting information indicating timings when the plurality of access points perform polling communication with the plurality of wireless terminals during the polling period. The access controller transmits, to each of the plurality of access points, a polling period start signal including the start standard time (Continued)

and a corresponding portion of the scheduling setting information for each of the plurality of access points. The plurality of access points perform polling communication with the plurality of wireless terminals based on respective polling period start signals.

8 Claims, 18 Drawing Sheets

(56) References Cited

U.S. PATENT DOCUMENTS

| | | | |
|---|---|---|---|
| 2003/0076842 A1* | 4/2003 | Johansson | H04L 41/00 370/401 |
| 2003/0123405 A1* | 7/2003 | del Prado | H04W 74/0816 370/331 |
| 2004/0141490 A1* | 7/2004 | Hong | H04W 74/06 370/345 |
| 2004/0143681 A1* | 7/2004 | Benveniste | H04W 12/06 709/249 |
| 2004/0156351 A1* | 8/2004 | Kim | H04W 74/06 370/349 |
| 2004/0160930 A1* | 8/2004 | Choi | H04L 29/06 370/338 |
| 2004/0185876 A1* | 9/2004 | Groenendaal | H04W 12/12 455/456.5 |
| 2005/0025131 A1* | 2/2005 | Ko | H04W 74/0816 370/352 |
| 2006/0092868 A1* | 5/2006 | Meier | H04L 12/1886 370/312 |
| 2006/0164969 A1* | 7/2006 | Malik | H04B 7/0408 370/203 |
| 2006/0182073 A1* | 8/2006 | Pani | H04W 84/12 370/338 |
| 2006/0193279 A1* | 8/2006 | Gu | H04W 74/06 370/312 |
| 2007/0058605 A1* | 3/2007 | Meylan | H04W 72/0406 370/346 |
| 2007/0097939 A1* | 5/2007 | Nylander | H04L 61/1511 370/338 |
| 2007/0264955 A1* | 11/2007 | Tsai, Jr. | H04W 68/00 455/186.1 |
| 2008/0025274 A1* | 1/2008 | Cheng | H04W 74/06 370/338 |
| 2008/0025275 A1* | 1/2008 | Cheng | H04W 48/20 370/338 |
| 2008/0279155 A1* | 11/2008 | Pratt, Jr. | H04L 12/66 370/336 |
| 2009/0147768 A1* | 6/2009 | Ji | H04J 3/0664 370/350 |
| 2009/0213776 A1* | 8/2009 | Chu | H04W 16/14 370/312 |
| 2009/0279487 A1* | 11/2009 | Reumerman | H04W 40/24 370/329 |
| 2010/0135256 A1* | 6/2010 | Lee | H04W 16/14 370/336 |
| 2010/0317388 A1* | 12/2010 | Chu | H04L 5/0037 455/509 |
| 2011/0007672 A1* | 1/2011 | Park | H04W 16/14 370/280 |
| 2011/0149731 A1* | 6/2011 | Gong | H04W 4/08 370/235 |
| 2011/0305216 A1* | 12/2011 | Seok | H04W 74/08 370/329 |
| 2012/0281545 A1 | 11/2012 | Fujiwara et al. | |
| 2013/0223305 A1* | 8/2013 | Doppler | H04W 52/0216 370/311 |
| 2013/0272315 A1* | 10/2013 | Yonge, III | H04L 12/2801 370/445 |
| 2014/0106802 A1* | 4/2014 | Cheng | H04W 72/12 455/509 |
| 2014/0241240 A1* | 8/2014 | Kloper | H04W 16/28 370/328 |

FOREIGN PATENT DOCUMENTS

| | | |
|---|---|---|
| JP | 2005-080162 A | 3/2005 |
| JP | 2005-340943 A | 12/2005 |
| JP | 2007-336131 A | 12/2007 |
| JP | 2012-235453 A | 11/2012 |

* cited by examiner

| SLOT# AP | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | 1 | -1 | 0 | 0 | 0 | 0 | 0 | 0 | 0 | 0 | 0 | 0 | 0 | -1 |
| 2 | 0 | 0 | 2 | 3 | 4 | 5 | 6 | -1 | -1 | 0 | 0 | 0 | 0 | -1 |
| 3 | 0 | 0 | 0 | 0 | 0 | 0 | 0 | 0 | 0 | 7 | 8 | 9 | -1 | -1 |

706c

| AP \ STA | 9 | 2 | 3 | 8 | 6 | 1 | 4 | 5 | 7 |
|---|---|---|---|---|---|---|---|---|---|
| 1 | 1 | 1 | 1 | 1 | 0 | 1 | 0 | 0 | 0 |
| 2 | 1 | 1 | 1 | 0 | 1 | 0 | 1 | 1 | 0 |
| 3 | 1 | 0 | 0 | 1 | 1 | 0 | 0 | 0 | 1 |
| sum | 3 | 2 | 2 | 2 | 2 | 1 | 1 | 1 | 1 |

FIG. 15C

| AP \ SLOT# | 1 | 2 | 3 | 4 | 5 | 6 |
|---|---|---|---|---|---|---|
| 1 | 0 | 0 | 0 | 0 | 1 | 0 |
| 2 | 0 | 2 | 3 | 4 | 6 | 5 |
| 3 | 9 | 7 | 0 | 8 | 0 | 0 |

| AP \ SLOT# | 1 | 2 | 3 |
|---|---|---|---|
| 1 | 0 | 0 | -1 |
| 2 | 5 | 6 | -1 |
| 3 | 8 | 0 | -1 |

WIRELESS TRANSMISSION SYSTEM

CLAIM OF PRIORITY

The present application claims priority from Japanese patent application JP2013-160526 filed on Aug. 1, 2013, the content of which is hereby incorporated by reference into this application.

BACKGROUND

The present invention relates to a wireless transmission system. In recent years the wireless LAN standard using the IEEE 802.11 as a standard therefor is utilized globally. A typical method of media access includes an autonomous distributed control system based method such as Distributed Coordination Function (DCF) or Enhanced Distributed Channel Access (EDCA). Meanwhile, in order to assure QoS (Quality of Service) to customers and to provide services for which timeliness is required, centralized control system methods such as Point Coordination Function (PCF) or Hybrid Coordination Function Controller Channel Access (HCCA), or the like, which uses polling signals, are widely used.

JP2012-235453A and JP2005-80162A exist as background art of the present disclosure. JP2012-235453A describes "Selective polling techniques are utilized to selectively poll stations within a wireless network in order to ensure that a station failing to properly transmit data is given an opportunity to rectify the transmission failure. The selective polling techniques can be applied to any polling-based system, thus maintaining backwards compatibility with legacy systems" (Abstract).

JP2005-80162A describes "The radio base station device for exchanging data with a plurality of radio terminal devices is provided with: a means for transmitting a beacon in the period of TB; a means for transmitting data after access control according to a CSMA/CA protocol; a means for transmitting to a radio terminal device a polling signal giving an instruction of down data transmission and up data transmission; a means for transmitting a polling signal to be transmitted to the radio terminal device preferentially over a packet to be transmitted according to the CSMA/CA protocol; and a means for making, when data having a period of a time interval T1 are transmitted or received, the beacon transmission interval TB to be m times of T1 (m is a natural number) and virtually making the time interval T1 to be a slot with a fixed time interval T2 having a relationship of T1=n T2 (n is a natural number)" (Abstract).

SUMMARY

In JP2012-235453A, a structure of an access point which includes a wireless receiver polling a plurality of stations in accordance with a schedule is disclosed. In JP2005-80162A, a structure of a wireless base station device which transmits and receives data to and from a plurality of wireless terminal devices via a wireless packet is disclosed.

However, the technology according to JP2012-235453A is not operable in a situation in which a plurality of access points are used, and thus unable to expand the area of coverage using the wireless transmission system. According to the wireless base station device technology of JP2005-80162A, there may be occasions where none of the terminals are operable to obtain a transmission right at a certain interval such that QoS is not guaranteed.

If the technology according to JP2012-235453A is applied straightforwardly to a plurality of access points, even though the coverage area of the wireless transmission system may be enlarged theoretically, following problems may occur.

For example, a situation is assumed where a wireless terminal arranged at an area that is covered by two access points is transmitting data signals to one of the access points while the other access point receives no data signal from any wireless terminals. Further, it is also assumed that the distance between the wireless terminal and another terminal which is included in a basic service set formed by the other access point is so great that signals transmitted from either terminal are undetectable by the other terminal.

In such environment, the other wireless terminal will attempt to transmit data signals to the other access point. As a consequence, both of the wireless terminals included in the same coverage of the other access point simultaneously transmit data.

Also, for example, according to IEEE802.11 standard there is a limitation on usable frequency channels such that in a wireless transmission system in which a plurality of access points are arranged the same frequency must be shared among the access points. As a consequence, when two of the access points share the same frequency, the data signals transmitted from two terminals each arranged in the coverage of one of the access points will collide resulting in neither terminal being able to transmit data signals to the access point.

Accordingly, when a plurality of access points are used in the technology as disclosed in JP2012-235453A, it may not be able to assure QoS as data signals transmitted by the wireless terminals each arranged in an area where coverage areas from multiple access points overlap with one another will potentially collide with one another.

Therefore, the present invention provides a wireless transmission system operable to assure QoS, allow easy linkage among a plurality of access points, and expand communication areas thereof.

A representative example of the invention is a wireless transmission system including a plurality of access points configured to communicate with wireless terminals connected with the plurality of access points, and an access controller configured to communicate with the plurality of access points. Each of the plurality of access points retains first information indicating wireless terminals included in a corresponding coverage area of each of the plurality of access points, and second information indicating wireless terminals connected with the corresponding access point within the corresponding coverage area. Each of the plurality of access points transmits updated information of the first information and the second information to the access controller. The access controller retains third information indicating correlations between the plurality of access points and wireless terminals included in coverage areas of the plurality of access points, and fourth information indicating correlations between the plurality of access points and the wireless terminal connected with the plurality of access points. The access controller updates the third information and the fourth information based on the updated information received from the plurality of access points. The access controller determines a start standard time for a polling period for the plurality of access points to perform polling communication with a plurality of wireless terminals. The access controller generates a scheduling setting information indicating timings when the plurality of access points perform polling communication with the plurality of wireless terminals during the polling period based on the updated third information and updated fourth information. The access controller transmits, to each of the plurality of access points, a polling period start signal including the start standard time and a corresponding portion of the scheduling setting information for each of the plurality of access points. The plurality of access points perform polling communication with the plurality of wireless terminals based on respective polling period start signals.

According to an aspect of the present invention, it becomes possible to link a plurality of access points in a facilitated manner and expand a communication enabled area while maintaining QoS.

Objects, configurations, and effects of this invention other than those described above will be clarified in the description of the following embodiments.

BRIEF DESCRIPTION OF THE DRAWINGS

FIG. 15C is a table illustrating a generation process of the scheduling table for the exhaustive polling phase in Embodiment 4;

FIG. 15D illustrates an example of a configuration of the scheduling table for the exhaustive polling phase in Embodiment 4;

FIG. 15E illustrates an example of a configuration of the scheduling table indicating the polling timing for the selective polling phase and the CSMA phase in a case when the wireless terminals fail to perform data transmission during the exhaustive polling phase in Embodiment 4;

DETAILED DESCRIPTION OF THE EMBODIMENTS

Hereinafter, embodiments of this invention will be described in detail with reference to the drawings. The elements common to the drawings are assigned the same reference signs.

In the embodiments of the present invention, a wireless transmission system will be described. The wireless transmission system according to the present embodiment includes an access controller, a plurality of access points each connected to the access controller, and a wireless terminal connected to one of the plurality of access points.

The access controller generates a scheduling table arranged to indicate timings at which the access points perform polling communications based on the information of an all AP collision table and the information of an all AP association table. Each access point performs polling communications based on the information of the scheduling table received from the access controller.

Further, when a collision table and an association table of each access point are updated, the access controller updates the all AP collision table and the all AP association table, and generates the scheduling table based on the updated information.

Embodiment 1

Hereinafter, a first embodiment of the present invention will be described with reference to drawings.

Figure 1:
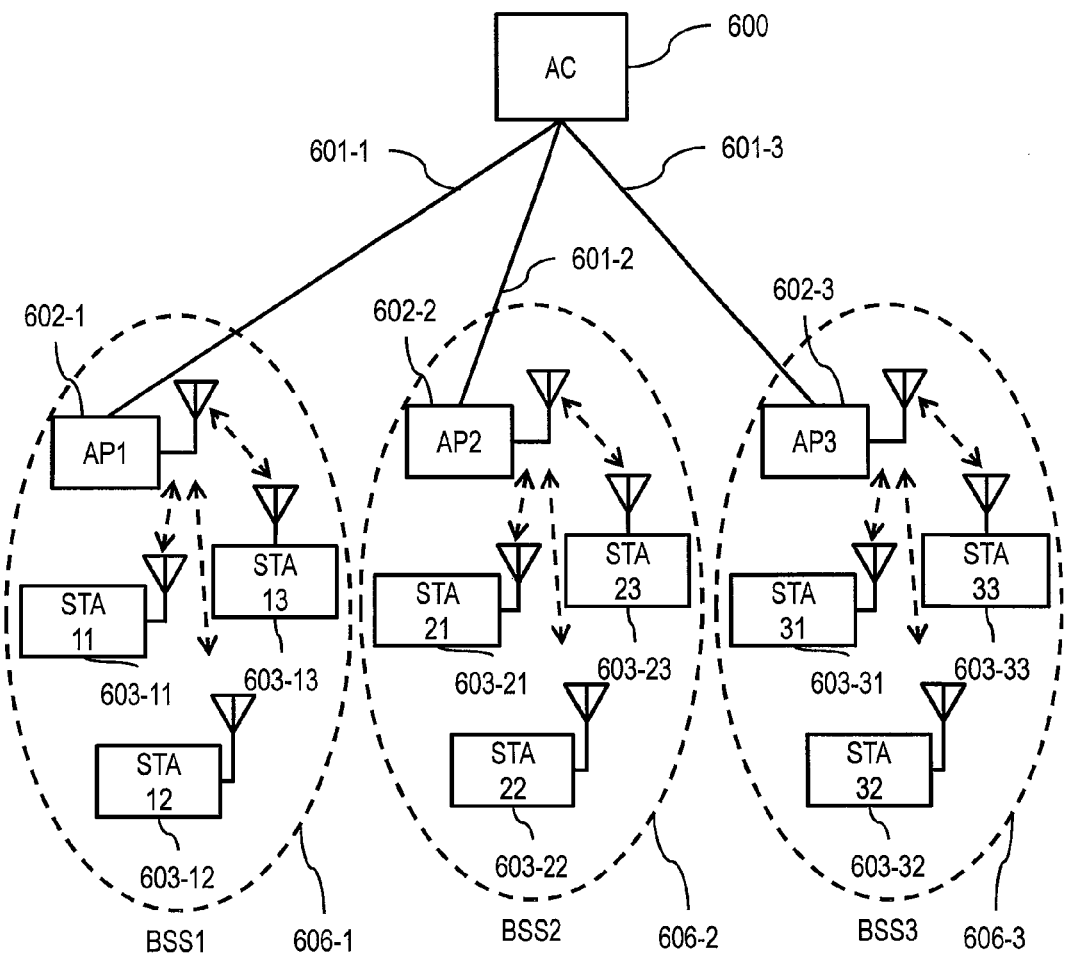
FIG. 1 illustrates an example of an outline of a wireless transmission system in Embodiment 1.

FIG. 1 illustrates an example of an outline of a wireless transmission system according to the present embodiment. The wireless transmission system according to the present embodiment includes an access controller (AC) 600, wired cables 601-1 to 601-3, access points (AP) 602-1 to 602-3, and wireless terminals (STA) 603-11 to 603-13, 603-21 to 603-23, and 603-31 to 603-33.

The access controller 600 and the access point 602-k (k is an arbitrary number from 1 to 3) are connected to one another via the wired cable 601-k so as to communicate with one another. The access point 602-k and the wireless terminal 603-k1 (1 is an arbitrary number from 1 to 3) perform communications with one another via wireless signals. A network which includes the access point 602-k and the wireless terminals 603-k1 to 603-k3 each connected to the access point 602-k will be referred to as a basic service set (BSS) 606-k.

Note in the following description that the wired cable 601-k will simply be referred to as the wired cable 601 if no particular distinction is made among the wired cables 601. Likewise, the same applies to the access point 602-k and the wireless terminal 603-k1, which will simply be referred to as the access point 602 and the wireless terminal 603, respectively. Also note that the number of the access controller 600, the wired cable 601, the access point 602, and the wireless terminal 603 may not be limited in any way, provided that the features of the wireless transmission system according to the present embodiment are realized.

Figure 2:
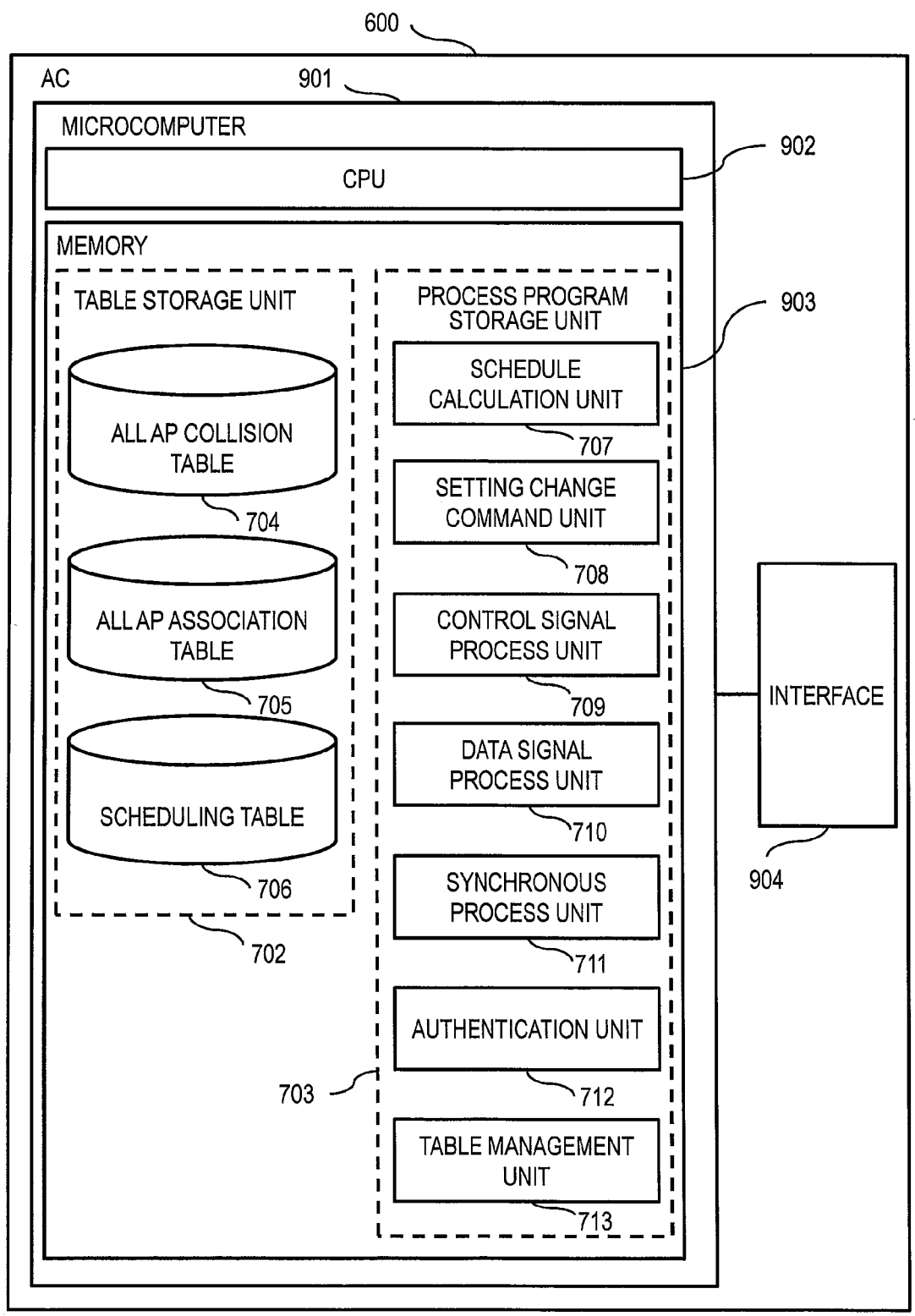
FIG. 2 illustrates an example of a configuration of the access controller in Embodiment 1.

FIG. 2 illustrates an example of a configuration of the access controller 600 illustrated in FIG. 1. The access controller 600 includes a microcomputer 901 and an interface 904. The microcomputer 901 controls communications. The microcomputer 901 includes a CPU 902 and a memory 903, and is connected to the interface 904. The interface 904 communicates with the access point 602 via a wired cable.

The memory 903 includes a table storage unit 702 and a process program storage unit 703. The table storage unit 702 includes an all AP collision table 704, an all AP association table 705, and a scheduling table 706. The details of these tables will be described below. The process program storage unit 703 includes a schedule calculation unit 707, a setting change command unit 708, a control signal process unit 709, a data signal process unit 710, a synchronous process unit 711, an authentication unit 712, and a table management unit 713. Note that each unit included at the process program storage unit 703 is a program. The CPU 902 realizes a function of each unit by operating in accordance with each respective program.

The schedule calculation unit 707 generates the scheduling table 706 based on the information of the all AP collision table 704 and the informational of the all AP association table 705. The setting change command unit 708 transmits to each access point 602 a polling period start signal (described below) so as to command a change of contents, or the like, for the polling table 806 of each access point 602.

The control signal process unit 709 corresponds, or the like, to a request to update the scheduling table requested from the access point 602. The data signal process unit 710 performs modulation and demodulation of data signals so as to transmit data signals to and receive data signals from the access point 602. The synchronous process unit 711 generates a polling period start signal which includes the information of the scheduling table 706 and the information concerning a polling period start standard time for each access point 602. A polling period refers to a period in which a cycle of an SI (Service Interval: service period) for each basic service set 606 is carried out. Note the synchronous process unit 711 does not necessarily provide the polling period start standard time in a specific numerical value. For example, the polling period start standard time may be a time when the access point 602 receives a polling period start signal and is operable to start performing polling communications.

The authentication unit 712 makes a determination as to whether or not to authorize a request for updating the scheduling table received from the access point 602. The table management unit 713 updates the all AP collision table 704, the all AP association table 705, and the scheduling table 706, for example.

Figure 3:
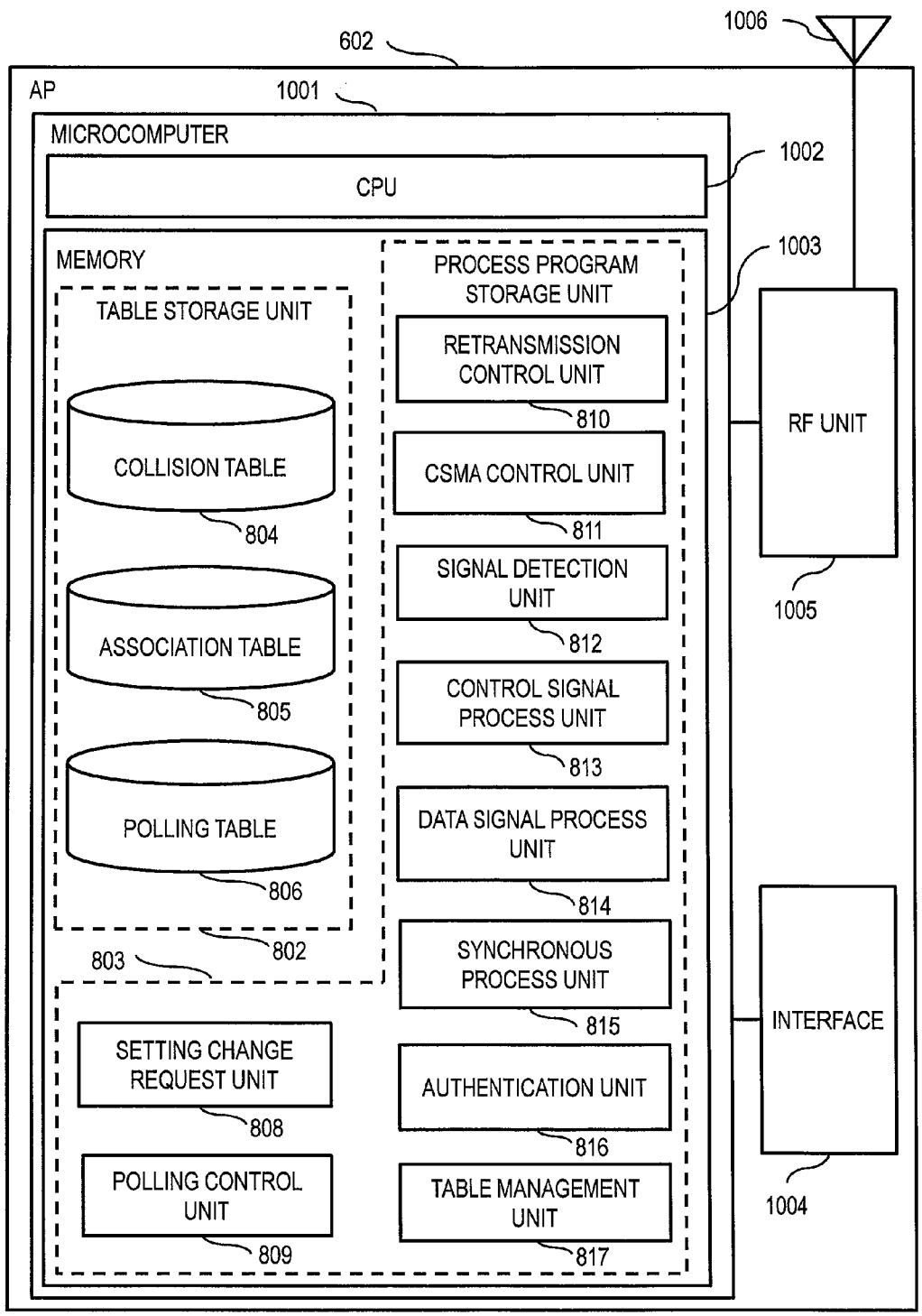
FIG. 3 illustrates an example of a configuration of the access point in Embodiment 1.

FIG. 3 illustrates an example of a configuration of the access point 602 illustrated in FIG. 1. The access point 602 includes a microcomputer 1001, an interface 1004, an RF unit 1005, and an antenna 1006. The microcomputer 1001, which includes a CPU 1002 and a memory 1003 and is connected to the interface 1004 and the RF unit 1005, is arranged to control communications. The interface 1004 communicates with the access controller 600 via a wired cable. The antenna 1006 is connected to the RF unit 1005, which communicates with the wireless terminal 603 using wireless signals.

The memory 1003 includes a table storage unit 802 and a process program storage unit 803. The table storage unit 802 stores therein a collision table 804, an association table 805, and a polling table 806. The details of these tables will be described below. The process program storage unit 803 includes a setting change request unit 808, a polling control unit 809, a retransmission control unit 810, a CSMA (Carrier Sense Multiple Access) control unit 811, a signal detection unit 812, a control signal process unit 813, a data signal process unit 814, a synchronous process unit 815, an authentication unit 816, and a table management unit 817. Note that each unit included at the process program storage unit 803 is a program. The CPU 1002 realizes a function of each unit by operating in accordance with each respective program.

The setting change request unit 808 of the access point 602 requests the access controller 600 to update the all AP collision table 704 and the all AP association table 705 when the table management unit 817 of the same access point 602 updates the collision table 804 and the association table 805 thereof.

The polling control unit 809 controls, in accordance with the polling table 806, the timing at which the wireless terminal 603 associated with the access point 602 performs data transmission in an exhaustive polling phase (described below). The retransmission control unit 810 controls, in accordance with the polling table 806, the timing at which the wireless terminal 603 retransmits data in a selective polling phase (described below) when the wireless terminal 603 fails to transmit data in the exhaustive polling phase. The CSMA control unit 811 controls, in accordance with the polling table 806, the wireless terminal 603, which is associated therewith, in a CSMA phase (described below).

The signal detection unit 812 detects data signals transmitted from the wireless terminal 603. The control signal process unit 813 performs a process in response to a connection request from the wireless terminal 603 and requests an update of the scheduling table 706 to the access controller 600. The data signal process unit 814 performs transmission and reception of data signals with the data signal process unit 710 of the access controller 600 and the wireless terminal 603 so as to perform modulation and demodulation of the data signals.

The synchronous process unit 815, in accordance with the information of the polling period start standard time included in the polling period start signal which is generated by the synchronous process unit 711 of the access controller 600, synchronizes the timing for the start of a polling period with another access point 602. The authentication unit 816 makes a determination as to whether or not to authorize a connection request received from the wireless terminal 603. The table management unit 817 updates the collision table 804, the association table 805, and the polling table 806.

Figure 4:
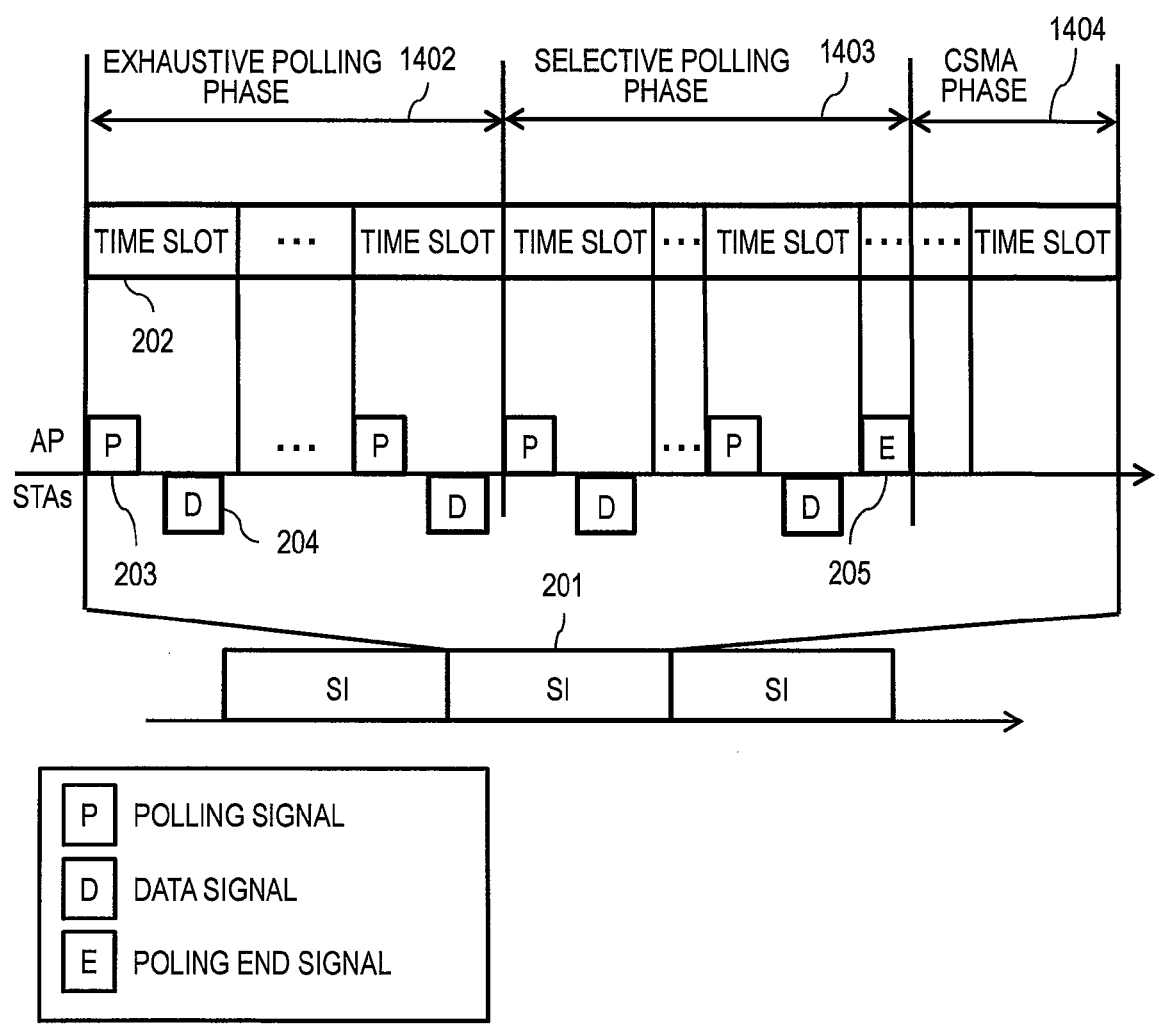
FIG. 4 is a diagram for describing the timing at which the access point and each wireless terminal transmit and receive data during one SI of the basic service set in Embodiment 1.

FIG. 4 is a diagram for describing the timing at which the access point 602 and each wireless terminal 603 transmit and receive data therebetween during one SI 201 of the basic service set 606. The SI 201 includes 3 phases arranged in the order as depicted in the drawing from left to right: an exhaustive polling phase 1402; a selective polling phase 1403; and a CSMA phase 1404. These phases are collectively referred to as a communication phase, wherein the exhaustive polling phase 1402 and the selective polling phase 1403 are collectively referred to as a polling phase. The details and allocations of the communication phase will be described below.

During the exhaustive polling phase 1402, the polling control unit 809 performs polling in a successive manner to all of the wireless terminals 603 that belong to the basic service set 606 so as to allow each of the wireless terminals 603 to perform data transmission. The data signal process unit 814 receives the data transmitted by the wireless terminals 603 so as to detect errors in the data.

In the subsequent phase of the selective polling phase 1403, the retransmission control unit 810 performs polling to the wireless terminal 603, which in the previous exhaustive polling phase 1402 transmitted data from which an error was detected, so as to perform retransmission control. By virtue of such procedure, it becomes possible to reduce a packet loss rate. Such retransmission control is carried out until no error is detected from data that is retransmitted from the wireless terminals 603 at which point the selective polling phase 1403 ends. However, it is to be noted that in a case the end time for the SI 201, which is defined by the polling table 806, is reached while the selective polling phase 1403 is yet to be finished, the selective polling phase 1403 is concluded. In other words, the selective polling phase 1403 is concluded at either when no error is detected in retransmitted data, or when the end time for the SI 201 is reached whichever happens earlier.

If the selective polling phase 1403 is finished before the end time for the SI 201 is reached, the data signal process unit 814 transmits a polling end signal 205 to each wireless terminal 603 so as to inform that the selective polling phase 1403 is finished. When the data signal process unit 814 transmits the polling end signal 205 to notify the end of the selective polling phase 1403, the CSMA phase 1404 starts. During the CSMA phase 1404, the CSMA control unit 811 performs data communications with all of the wireless terminals 603 via a CSMA method. The CSMA phase 1404 ends when the end time for the SI 201 is reached. By establishing the CSMA phase 1404, it becomes possible to control the wireless terminal 603 which is not implemented with a priority control feature thereby maintaining compatibility.

It is to be noted that the length of each polling period, the length of the SI 201 for each basic service set 606, and the length of each communication phase in the SI 201 according to the present embodiment are determined by the schedule calculation unit 707 allocating time slots 202 to the scheduling table 706. Also note that the time slot 202 refers to a period for a succession of polling communications. In other words, the time slot 202 refers to a period between when the access point 602 starts the transmission of polling signals 203 to one of the wireless terminal 603 and when the access point 602 receives data signals 204 transmitted from the wireless terminal 603.

The length of the exhaustive polling phase 1402 is determined by the schedule calculation unit 707 in accordance with the number of the wireless terminals 603 associated with a given access point 602. For example, the schedule calculation unit 707 is operable to allocate to the exhaustive polling phase 1402 the same number of time slots 202 as the number of wireless terminals 603 associated with the access point 602. At this point, the polling control unit 809 performs polling one time to each wireless terminal 603.

As stated above, since a boundary between the selective polling phase 1403 and the CSMA phase 1404 is determined in accordance with the status of data communication, the length of each phase will not be indicated in the scheduling table 706. However, a combined length of the length of the selective polling phase 1403 and the length of the CSMA phase 1404 will be indicated in the scheduling table 706.

The combined length of the length of the selective polling phase 1403 and the length of the CSMA phase 1404 is determined, for example, by the schedule calculation unit 707 in accordance with the number of wireless terminals 603 that are associated with each access point 602. For example, a method in which the time slot 202 is allocated to the selective polling phase 1403 and the CSMA phase 1404 in proportion to the number of wireless terminals that are associated with each access point 602 may be used.

It is to be noted that while it is described herein that the schedule calculation unit 707 determines the length of the exhaustive polling phase 1402, the selective polling phase 1403, and the CSMA phase by allocating thereto the time slot 202 so as to determine the length of the SI 201 and then the length of the polling period, the order for such determining procedures is not limited to as described above, provided that all the conditions for determining the length of each phase and each period that are stated above are satisfied. In other words, an order to determine the lengths of the polling period, the SI 201, the exhaustive polling phase 1402, the selective polling phase 1403, and the CSMA phase may be chosen freely.

Figure 5:
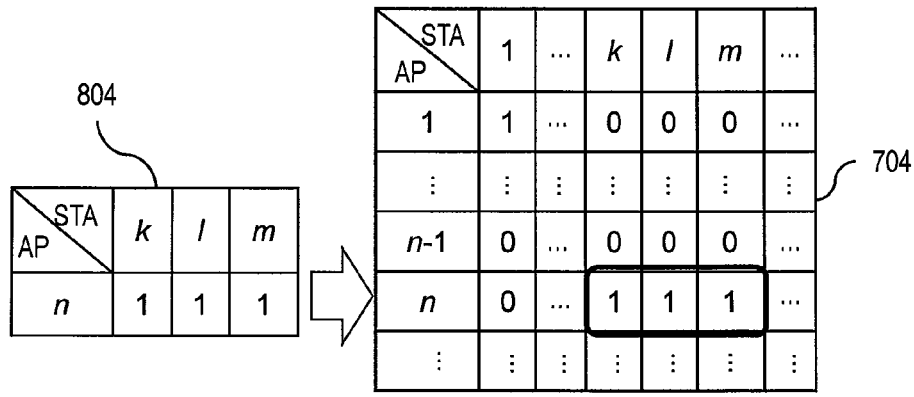
FIG. 5 illustrates an example in which the all AP collision table update request signal is transmitted to the access controller from an access point in Embodiment 1.

FIG. 5 illustrates an example of configurations of the collision table 804 and the all AP collision table 704. The collision table 804 is arranged to retain information of the wireless terminal 603 which is arranged within the coverage area of the access point 602 and is detected by the access point 602.

For example, the collision table 804 is a single row table arranged to include a row for identification information which uniquely identifies each access point 602 and a column for identification information which uniquely identifies each wireless terminal 603, wherein each cell of the collision table 804 stores therein either 0 or 1.

In step S1101 (described below) in FIG. 8, when the access point 602 detects within its coverage area a new wireless terminal 603, the table management unit 817 stores 1 in a corresponding cell when the collision table 804 includes a column corresponding to the identification information of the detected wireless terminal 603. When the collision table 804 does not include a column corresponding to the identification information of the detected wireless terminal 603, the table management unit 817 adds a column corresponding thereto and stores 1 in a corresponding cell.

When the access point 602 does not detect within its coverage area the wireless terminal 603 for a predetermined period of time such that the access point 602 does not receive a probe request signal, or the like, from the wireless terminal 603 for a predetermined period of time, the table management unit 817 stores 0 in a corresponding cell. Further, in such case the corresponding column may be deleted.

The all AP collision table 704 is arranged to retain information of the wireless terminal 603 which is arranged within the coverage area of any one of all access points 602 under the control of the access controller 600 and which is detected by the access point 602.

For example, the all AP collision table 704 is a table arranged to include a row for a list of identification information which uniquely identifies any one of all access points 602 under the control of the access controller 600 and a column for a list of identification information which uniquely identifies any one of all wireless terminals 603 included in the wireless transmission system according to the present embodiment, wherein each cell of the all AP collision table 704 stores therein either 0 or 1.

In step S1111 (described below) in FIG. 8, the table management unit 713 updates the all AP collision table 704 based on the information of the collision table 804 included in an all AP collision table update request signal which is transmitted from each access point 602. This will be descried in detail with reference to FIG. 5.

FIG. 5 illustrates an example in which the all AP collision table update request signal is transmitted to the access controller 600 from an access point 602-n. By referring to the information of the collision table 804 included in the all AP collision table update request signal, it shows that wireless terminals 603-k, 603-l, and 603-m are arranged within the coverage area of the access point 602-n. Accordingly, the table management unit 713 stores 1 in each cell corresponding to the wireless terminals 603-k, 603-l, and 603-m in the row corresponding to the access point 602-n of the all AP collision table 704, and stores 0 in all other cells.

Figure 6:
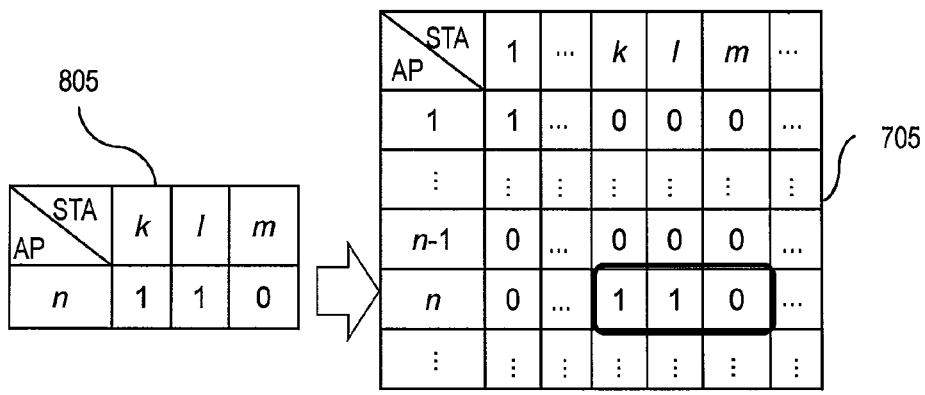
FIG. 6 illustrates an example of configurations of the association table and the all AP association table in Embodiment 1.

FIG. 6 illustrates an example of configurations of the association table 805 and the all AP association table 705. The association table 805 is arranged to retain information of the wireless terminal 603 currently associated with the access point 602.

For example, the association table 805 is a single row table arranged to include a row for identification information which uniquely identifies the access point 602 and a column for a list of identification information which uniquely identifies any one of the wireless terminals 603, wherein each cell of the association table 805 stores therein either 0 or 1. In step S1106 (described below) in FIG. 8, when the authentification unit 816 of the access point 602 gives authorization to a connection request transmitted from the wireless terminal 603, the table management unit 817 stores 1 in the cell corresponding to the wireless terminal 603 if the association table 805 includes a column corresponding to the identification information of the wireless terminal 603. If the association table 805 does not include a column corresponding to the identification information of the wireless terminal 603, a column corresponding thereto will be added and 1 will be stored in the corresponding cell.

When the access point 602 receives a shut off request from the wireless terminal 603, or when the signal detection unit 812 of the access point 602 detects a shut off of data signals from the wireless terminal 603 as described with reference to step S1118 (described below) in FIG. 8, the table management unit 817 stores 0 in a corresponding cell in the association table 805. Also, in such case the column may be deleted.

The all AP association table 705 retains information of the wireless terminal 603 currently associated with any one of all access points 602 that are under the control of the access controller 600.

For example, the all AP association table 705 is a table arranged to include a row for a list of identification information which uniquely identifies any one of all access points 602 under the control of the access controller 600 and a column for a list of identification information which uniquely identifies any one of all wireless terminals 603 included in the wireless transmission system according to the present embodiment, wherein each cell of the all AP association table 705 stores therein either 0 or 1.

In step S1110 (described below) in FIG. 8, the table management unit 713 updates the all AP association table 805 based on the information of the association table 805 included in an all AP association table update request signal which is transmitted from the access point 602. This will be descried in detail with reference to FIG. 6.

FIG. 6 illustrates an example of the access point 602-n transmitting the all AP association table update request signal to the access controller 600. Referring to the information of the association table 805 included in the all AP association table update request signal shows that the access point 602-n is associated with the wireless terminals 603-k and 603-l, but not with the wireless terminal 603-m. Accordingly, the table management unit 713 stores 1 in the cells corresponding to the wireless terminals 603-k and 603-l in the row corresponding to the access point 602-n of the all AP association table 705, and stores 0 in the cell corresponding to the wireless terminal 603-m and the rest of other cells.

Figure 7:
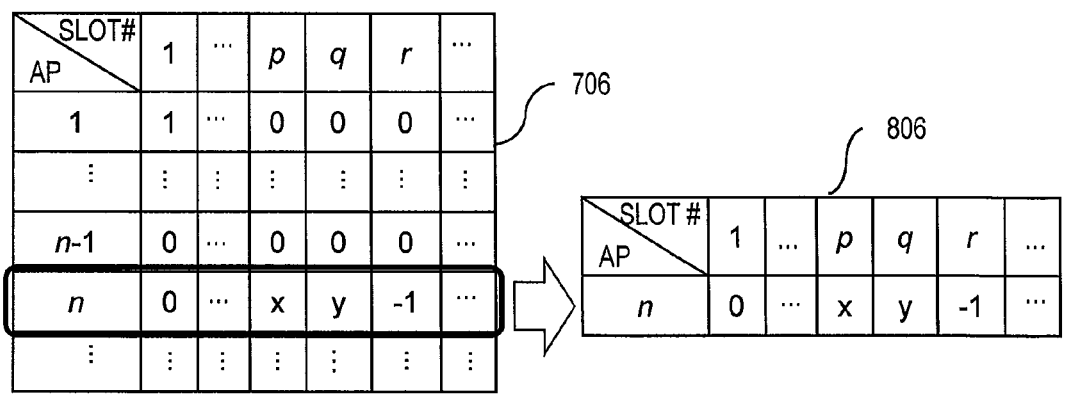
FIG. 7 illustrates an example of configurations of the scheduling table and the polling table in Embodiment 1.

FIG. 7 illustrates an example of configurations of the scheduling table 706 and the polling table 806. The scheduling table 706 is arranged to retain information concerning the timing at which each access point 602 under the control of the access controller 600 performs polling communication with the wireless terminal 603 of the basic service set 600.

For example, the scheduling table 706 is a table arranged to include a row for identification information which uniquely identifies any one of all access points 602 under the control of the access controller 600 and a column for the time slots 202, wherein each cell of the scheduling table 706 is stored with identification information which uniquely identifies the wireless terminal 603, 0, or −1. Further, the scheduling table 706 may include a row for frequency channel information of the access points 602.

Note when the access point 602 does not perform polling communication with any of the wireless terminals 603 in a given time slot 202, the table management unit 713 stores 0 in a corresponding cell. Further, when the time slot 202 is allocated to the selective polling phase 1403 and the CSMA phase 1404 for one of the access points 602, the table management unit 713 stores −1 in the corresponding cell.

The scheduling table 706 which is generated by the schedule calculation unit 707 based on the all AP collision table 704 and the all AP association table 705 may be generated differently in each embodiment of the present invention described herein. The details concerning the differences in the generation method will be described below.

The polling table 806 indicates the timing at which the access point 602 performs polling with each wireless terminal 603 of the basic service set 606. For example, the polling table 806 is a single row table arranged to include a row for identification information which uniquely identifies the access point 602 and a column for the time slot 202. Each cell of the polling table 806 is stored with the identification information which uniquely identifies the wireless terminal 603, 0, or −1.

In steps S1113 and S1124 (described below) in FIG. 8, when the access point 602 receives a polling period start signal, the table management unit 817 updates the polling table 806 based on the information of the scheduling table 706 which is included in the received polling period start signal. To be more specific, each access point 602 selects the row corresponding to the identification information thereof out of the information of the scheduling table 706 included in the received polling period start signal, and updates the row in the polling table 806. Note the information of the scheduling table 706 included in the polling period start signal may be a portion of the information of the scheduling table 706 so long as such information includes a row corresponding to the identification information of each access point 602.

Figure 8:
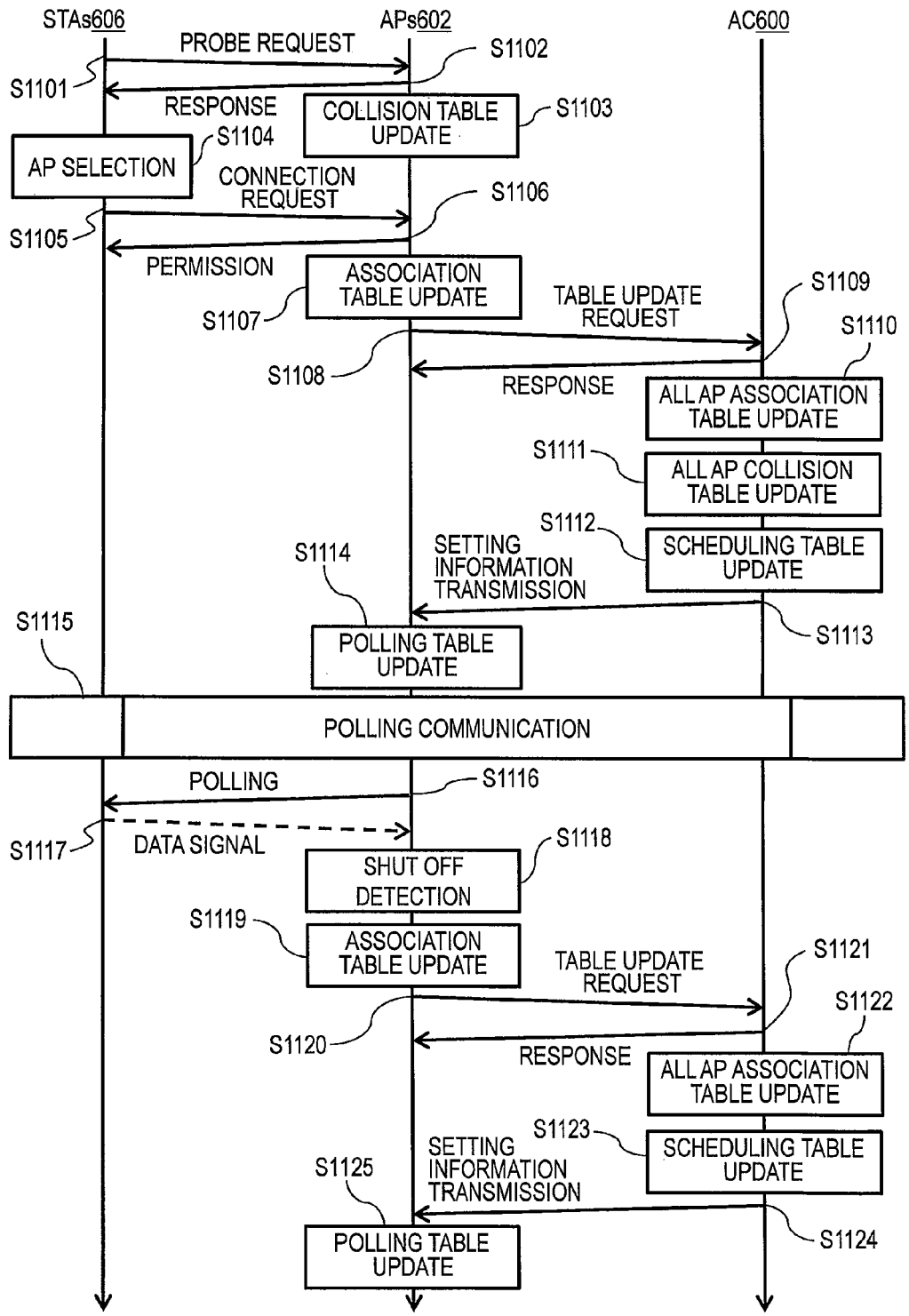
FIG. 8 is a sequence diagram illustrating an example of an operation of the wireless transmission system in Embodiment 1.

FIG. 8 is a sequence diagram illustrating an example of an operation of the wireless transmission system according to the present embodiment. Each wireless terminal 603 transmits a probe request signal at a fixed interval in order to detect the presence of the access point 602 in the area near the terminal (S1101). The control signal process unit 813 of the access point 602 which received the probe request signal transmits a response signal to the wireless terminal 603 (S1102). The table management unit 817 of the access point 602 generates or updates the collision table 804 based on the identification information of the wireless terminal 603 included in the probe request signal (S1103).

The wireless terminal 603 selects to which access point 602 to be connected after receiving the response signal from the access point 602 (S1104). Note that the wireless terminal 603 determines to which access point 602 to be connected based on a predetermined condition. Such predetermined condition may include the strength of RSSI of the received response signal, or the like.

The wireless terminal 603 transmits a connection request signal to the control signal process unit 813 of the access point 602 (S1105). The authentication unit 816 of the access point 602 carries out authentication, while the control signal process unit 813 of the access point 602 transmits a permission signal to the wireless terminal 603 (S1106). The table management unit 817 of the access point 602 updates the association table 805 based on the information of the wireless terminal 603 (S1107).

The setting change request unit 808 of the access point 602 transmits the all AP collision table update request signal and the all AP association table update request signal to the access controller 600, while the control signal process unit 813 of the access point 602 transmits a scheduling table update request signal to the access controller 600 (S1108).

When the access controller 600 receives the update request signal for any one of the tables, the control signal process unit 709 transmits a response signal to the access point 602 (S1109). The table management unit 713 updates (S1110) the all AP association table 705 based on the information of the association table 805 included in the all AP association table update request signal, and updates (S1111) the all AP collision table 704 based on the information of the collision table 804 included in the all AP collision table update request signal.

The schedule calculation unit 707 generates the schedule table 706 based on the information of the updated all AP association table 705 and the information of the updated all AP collision table 704, while the table management unit 713 updates the scheduling table 706 (S1112).

The synchronous process unit 711 of the access controller 600 determines the polling period start standard time of the access point 602, and generates a polling period start signal which includes the information of the start standard time and the information (scheduling setting information) of the schedule table 706. The setting change command unit 708 transmits the polling period start signal to the data signal process unit 814 of each access point 602 (S1113).

The table management unit 817 of each access point 602 updates the polling table 806 based on the scheduling setting information included in the received polling period start signal (S1114). Each access point 602 performs polling communication based on the polling table 806 per each basic service set 606 (S1115). The details of the polling communications (S1115) will be described below.

When, during a polling period, one of the access points 602 transmits a polling signal to the wireless terminal 603 arranged within the basic service set 606 (S1116), and when the data signal transmitted from the wireless terminal 603 is not received by the data signal process unit 814 of the access point 602 (S1117), the signal detection unit 812 of the access point 602 detects a shut off of data signal (S1118). The table management unit 817 updates the association table 805 so as to exclude the information of the wireless terminal 603 (S1119).

After the table management unit 817 updates the association table 805, the setting change request unit 808 of the access point 602 transmits the all AP association table update request signal to the access controller 600, while the control signal process unit 813 transmits the scheduling table update request signal to the access controller 600 (S1120)

When the access controller 600 receives the table update request signal, the control signal process unit 709 transmits a response signal to the access point 602 (S1121). The table management unit 713 updates the all AP association table 705 based on the information of the collision table 804 included in the all AP collision table update request signal (S1122).

The schedule calculation unit 707 generates the scheduling table 706 based on the information of the all AP collision table 704 and the information of the updated all AP association table 705, while the table management unit 713 updates the scheduling table 706 (S1123).

The setting change command unit 708 transmits the scheduling setting information to the data signal process unit 814 of each access point 602 (S1124). The table management unit 817 of each access point 602 updates (S1125) the polling table 806 based on the scheduling setting information, while the access point 602 performs polling communication again.

It is to be noted that the method in which the access point 602 detects the wireless terminal 603 arranged within its coverage in relation to steps S1101 and S1102 is not necessarily limited to what is described above. For example, in step S1101, each wireless terminal 603 may transmit a broadcast signal in order to let its presence known to the nearby access points 602. Further, in steps S1101 and S1102, each access point 602 may monitor the wireless terminal 603 arranged within the coverage area thereof in a fixed interval.

Figure 9:
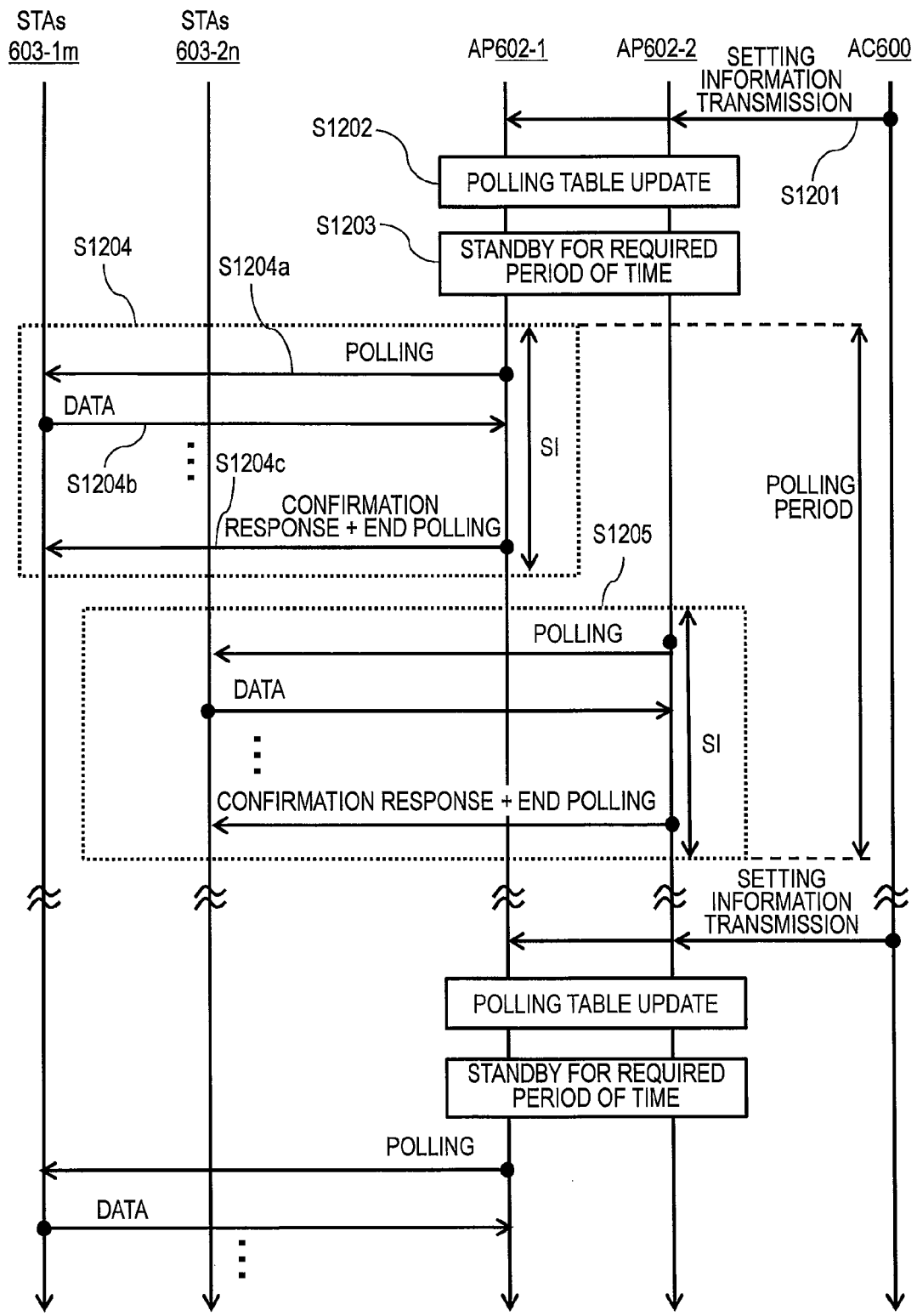
FIG. 9 is a sequence diagram illustrating an example of polling communication in Embodiment 1.

FIG. 9 is a sequence diagram illustrating an example of polling communication according to the present embodiment. Note that although FIG. 9 illustrates an example of the wireless transmission system having 2 access points, 602-1 and 602-2, the number of the access point 602 for the wireless transmission system of the present embodiment is not limited thereto as long as the functions of the wireless transmission system according to the present embodiment are realized. Further, FIG. 9 illustrates an example in which the access point 602-1 starts the SI 201 before the access point 602-2.

The synchronous process unit 711 of the access controller 600 generates the polling period start signal which includes the schedule setting information and the information on the standard time of when to start polling, while the setting change command unit 708 transmits the polling period start signal to the data signal process unit 814 of each of the access points 602-1 and 602-2 (S1201).

The table management unit 817 of each of the access points 602-1 and 602-2 receiving the polling period start signal updates the polling table 806 of each of the basic service sets 606-1 and 606-2 based on the scheduling setting information included in the polling period start signal (S1202).

The synchronous process unit 815 of each of the access points 602-1 and 602-2 stands by for a required period of time until the polling period starts based on the information of the polling period start standard time included in the polling period start signal (S1203). The access points 602-1 and 602-2 start the SI 201 in a sequential manner in accordance with the updated polling table 806 (S1204).

The access point 602-1 transmits a polling signal to each wireless terminal 603-1m (m is an arbitrary natural number) associated therewith (S1204a). Each wireless terminal 603-1m to which the polling signal is transmitted transmits a data signal to the data signal process unit 814 of the access point 602-1 (S1204b). The SI 201 of the step S1204 is divided into 3 phases: the exhaustive polling phase 1402, the selective polling phase 1403, and the CSMA phase 1404.

The control signal process unit 813 of the access point 602-1 transmits a confirmation response signal to the wireless terminal 603-1m, while the data signal process unit 814 transmits an end of communication phase notification signal to the wireless terminal 603-1m (S1204C). The wireless terminal 603-1m which received the end of communication phase notification signal stands by until next SI 201. After the SI 201 ends for the basic service set 606-1, the SI 201 for the basic service set 606-2 starts in accordance with the polling table 806 (S1205).

Note that the operations carried out in step S1205 by the access point 602-2 and each wireless terminal 603-2n (n is an arbitrary natural number) associated with the access point 602-2 are the same as the operations carried out in step S1204 by the access point 602-1 and each wireless terminal 603-1. The access point 602-1 and the access point 602-2 repeat the SI 201 for the basic service set 606-1 and the basic service set 602-2, respectively, a predetermined number of times.

Figure 10:
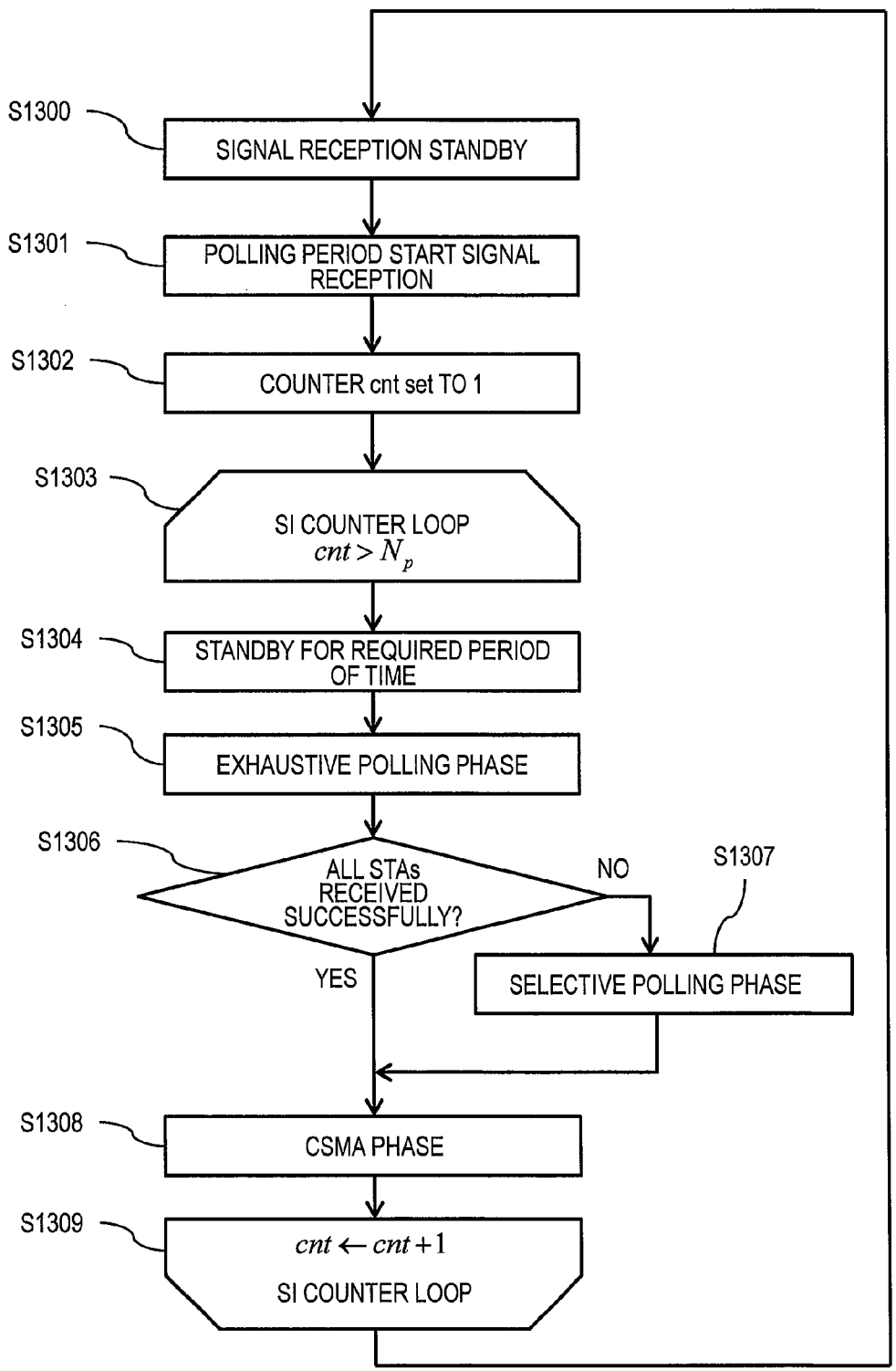
FIG. 10 is a flowchart illustrating an example of operations carried out by each access point while the access point performs polling communication in Embodiment 1.

FIG. 10 is a flowchart illustrating an example of operations carried out by each access point 602 while the access point 602 performs polling communication. Firstly, the access point 602 is in a reception standby status for the polling period start signal transmitted by the access controller 600 (S1300). When the data signal process unit 814 of the access point 602 receives the polling period start signal (S1301), the access point 602 sets a counter to 1 (S1302) and starts a SI counter loop (S1303).

The synchronous process unit 815 of the access point 602 causes the access point 602 to stand by for a required period of time until the timing at which polling is allowed to start based on the information of the polling period start standard time and the scheduling setting information included in the received polling period start signal (S1304). The polling control unit 809 of the access point 602 starts the exhaustive polling phase 1402 after the required period of standby time (S1305), and transmits polling signals in a sequential manner to the wireless terminal 603 associated thereto.

Each of the wireless terminals 603 that belongs to the basic service set 606 transmits a data signal to the data signal process unit 814 of the access point 602 in response to the polling signals transmitted thereto. After the exhaustive polling phase 1402 ends the data signal process unit 814 of the access point 602 checks whether or not the receptions of the data signals transmitted from all the wireless terminals 603 that belong to the basic service set 606 were successful (S1306).

When the data signal process unit 814 was unable to successfully receive the data signal transmitted from any one of the wireless terminal 603 belonging to the basic service set 606 (S1306: No), the access point 602 starts the selective polling phase 1403 in which the polling is attempted again to the wireless terminal 603 which previously failed to transmit the data signal. At this point, the retransmission control unit 810 sends an instruction to the wireless terminal 603 which previously failed to transmit data signal to retransmit the data signal (S1307).

When the data transmission to all of the wireless terminals 603 that belong to the basic service set 606 went successfully (S1306: Yes), or when the selective polling phase 1403 ends, the access point 602 starts the CSMA phase 1404. At this point, the CSMA control unit 811 controls the wireless terminal 603 (S1308). The access point 602 counts by using a counter the number of times the subroutine which includes steps S1304 to S1308 is carried out, ends the SI counter loop when the number reaches a predetermined value (S1309), and returns to the reception standby state (S1300).

Figures 11A, 11B, 11C:
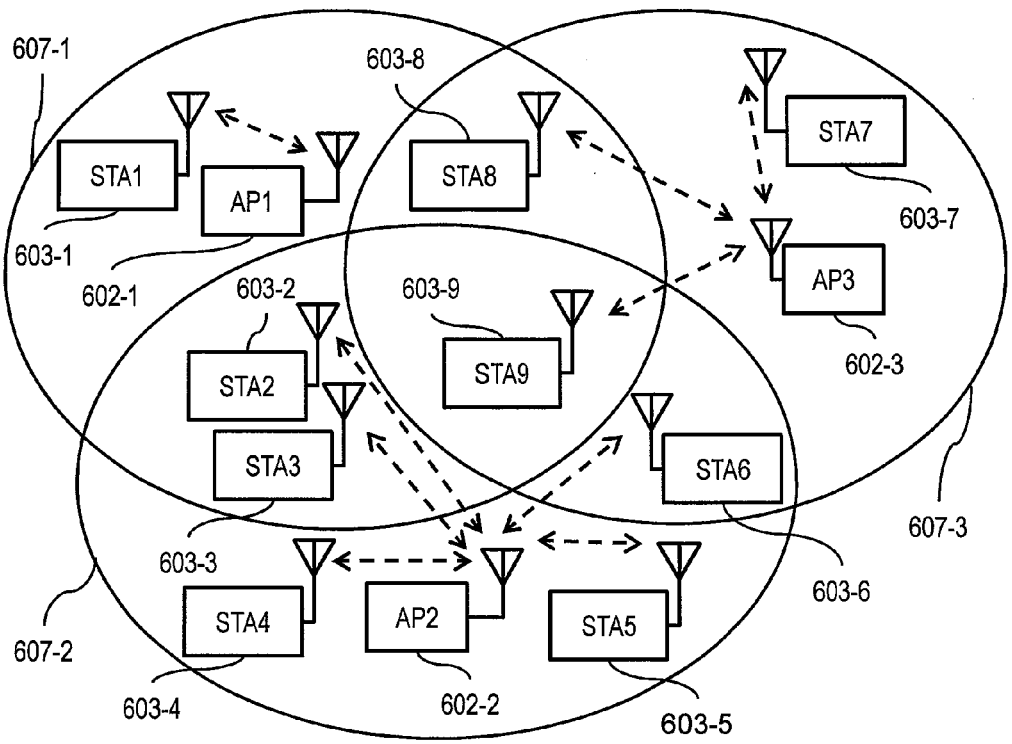
FIG. 11A illustrates an example of the wireless network in Embodiment 1.
FIG. 11B illustrates an example of a configuration of an all AP collision table in the wireless network illustrated in FIG. 11A in Embodiment 1.
FIG. 11C illustrates an example of a configuration of an all AP association table in the wireless network illustrated in FIG. 11A in Embodiment 1.

FIG. 11A illustrates an example of the wireless network for describing an example of a polling timing according to each embodiment of the present invention. The wireless network in FIG. 10A includes 3 access points and 9 wireless terminals: 602-1 to 602-3, and 603-1 to 603-9, respectively. While the access controller 600 and the wired cables 601-1 to 601-3 are omitted from FIG. 10A for the clarity of illustration, each of the access points 602-1 to 602-3 are connected to the access controller 600 via the wired cable 601.

The wireless terminals 603-1, 603-2, 603-3, 603-8, and 603-9 are included in a coverage 607-1 of the access point 602-1. The wireless terminals 603-2, 603-3, 603-4, 603-5, 603-6, and 603-9 are included in a coverage 607-2 of the access point 602-2. The wireless terminals 603-6, 603-7, 603-8, and 603-9 are included in a coverage 607-3 of the access point 602-3.

Further, while omitted from FIG. 11A for the clarity of illustration, the access point 602-1 is associated with the wireless terminal 603-1; the access point 602-2 is associated with the wireless terminals 603-2 to 603-6; the access point 602-3 is associated with the wireless terminals 603-7 to 603-9, wherein each association configures the basic service set 606-1 to 606-3, respectively.

FIG. 11B illustrates an example of a configuration of an all AP collision table 704b in the wireless network illustrated in FIG. 11A.

FIG. 11C illustrates an example of a configuration of an all AP association table 705b in the wireless network illustrated in FIG. 11A.

Figures 12A, 12B, 12C:
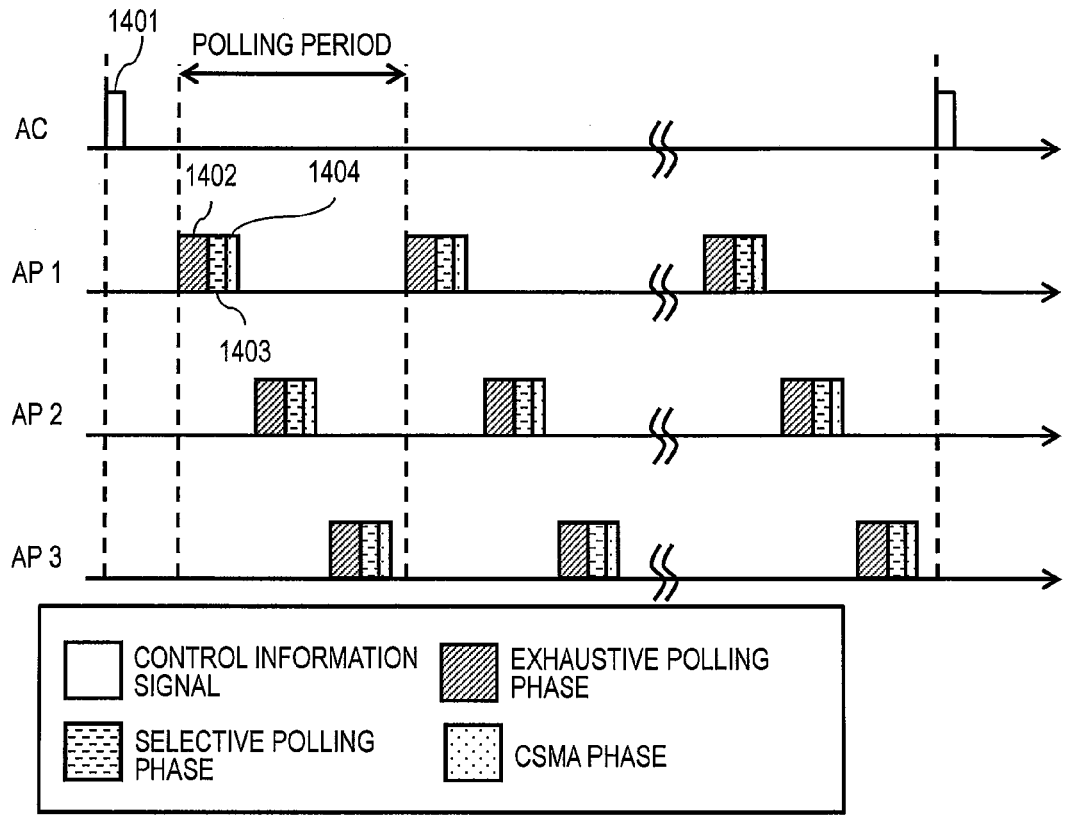
FIG. 12A is a timing chart illustrating an example of a polling timing of the wireless network illustrated in FIG. 11A in Embodiment 1.
FIG. 12B illustrates an example of a configuration of a combination of the access points and the wireless terminals and an order of the combinations performing polling communications in Embodiment 1.
FIG. 12C illustrates an example of a configuration of a scheduling table in Embodiment 1.

FIG. 12A is a timing chart illustrating an example of a polling timing when the wireless network illustrated in FIG. 11A is used in the present embodiment of the present invention.

The setting change command unit 708 of the access controller 600 transmits a polling period start signal 1401 to the synchronous process unit 815 of each of the access points 602-1 to 602-3. The table management unit 817 of each of the access points 602-1 to 602-3 updates the polling table 806 based on the scheduling setting information included in the received polling period start signal.

The synchronous process unit 815 of each of the access points 602-1 to 602-3 starts polling in each of the basic service sets 606-1 to 606-3 based on the information of the polling period start standard time included in the polling period start signal. In the present embodiment, a communication phase is allocated to the access points in the order of the access point 602-1, the access point 602-2, and then the access point 602-3. The communication phases are allocated to each access point 602 in the order of the exhaustive polling phase 1402, the selective polling phase 1403, and the CSMA phase 1404.

Further, the communication phases of the access point 602 is arranged so as not to overlap with the communication phases of another access point 602. By this, while one of the wireless terminals 603 is performing polling communication or CSMA communication with one of the access points 602 other access points 602 that are in the same coverage 607 in which the wireless terminal 603 is arranged are unable to perform polling communications or CSMA communications. Accordingly, it becomes possible to prevent collisions between data signals during polling periods, thereby it becomes possible to ensure QoS.

The access point 602-1 performs communications in accordance with the polling table 806. As for the access points 602-2 and 602-3, they do the same as the access point 602-1. The access points 602-1 to 602-3 repeat the above stated communication phases until the predetermined value is reached.

Hereinafter, a generation method of the scheduling table 706 according to the present embodiment will be described with reference to FIG. 12B and FIG. 12C. According to the present embodiment, the schedule calculation unit 707 generates the scheduling table 706 based on the information of the all AP association table 705b illustrated in FIG. 11C.

FIG. 12B illustrates an example of a configuration of a combination of the access points 602 and the wireless terminals 603 and an order of the combinations performing polling communications in each basic service set 606.

The schedule calculation unit 707, when generating the scheduling table 706, initially makes a determination on the order in which each access point 602 performs polling communication with the wireless terminal 603. The details of a method to determine the order will be described below.

As stated above, the communication phases are allocated to the access points 602-1, 602-2, and then to 602-3, respectively, according to the present embodiment. First, the wireless terminal 603-1 is the only wireless terminal that is associated with the access point 602-1. Accordingly, the wireless terminal 603-1 becomes the first wireless terminal to be polled.

In the same manner, since the wireless terminals 603-2 to 603-6 are associated with the access point 602-2, the wireless terminals 603-2 to 603-6 will be second to sixth wireless terminals to be polled, respectively. Since the wireless terminals 603-7 to 603-9 are associated with the access point 602-3, the wireless terminals 603-7 to 603-9 will seventh to ninth wireless terminals to be polled, respectively.

As stated above, upon determining the order in which each of the access points 602-1 to 602-3 perform polling communication to the wireless terminals 603-1 to 603-9, the schedule calculation unit 707 stores the identification information corresponding to each wireless terminal 603 in each cell of the current table in accordance with the determined order. Note when the access point 602 performs polling communication irrespective of such order, 0 is stored in the cell corresponding thereto.

FIG. 12C illustrates an example of a configuration of a scheduling table 706b which shows the polling timing illustrated in FIG. 12A. The schedule calculation unit 707 generates the scheduling table 706b by modifying the table illustrated in FIG. 12B. Hereinafter, a specific generation method of the scheduling table 706 according to the present embodiment will be described.

The schedule calculation unit 707 calculates the number of slots which will be necessary during the selective polling phase 1403 and the CSMA phase 1404 in each of the basic service sets 606-1 to 606-3 upon determining the order in which each of the access points 602-1 to 602-3 perform polling communication to the wireless terminals 603-1 to 603-9

Note that FIG. 12C illustrates an example in which the greater the number of the wireless terminals 603 belonging to each basic service set 606, the larger number of slots allocated to the selective polling phase 1403 and the CSMA phase 1404 becomes. The schedule calculation unit 707 inserts −1, which indicates the selective polling phase 1403 and the CSMA phase 1404, to the table illustrated in FIG. 12B in a manner corresponding to the number of slots calculated in the table illustrated in FIG. 12B.

According to the wireless transmission system of the present embodiment, it becomes possible to expand a communication area by arranging a plurality of access points 602. Further, according to the scheduling of the present embodiment, while one of the wireless terminals 603 performs polling communication or CSMA communication with one of the access points 602, other access points 602 in whose coverage area the presently communicating wireless terminal 603 is arranged do not perform polling communication or CSMA communication. Accordingly, the wireless transmission system according to the present embodiment is operable to prevent collisions of data signals, and thereby it becomes possible to secure QoS.

Embodiment 2

According to a wireless transmission system of this embodiment of the preset invention, it becomes possible to reduce the polling period. The main difference between the wireless transmission system according to the present embodiment and the wireless transmission system according to Embodiment 1 includes that in the wireless transmission system according to the present embodiment a CSMA phase starts only after the end of a selective polling phase for all the basic service sets 606 as opposed to the CSMA phase starting for each basic service set 606 as soon as the selective polling phase thereof ends.

Figures 13A, 13B:
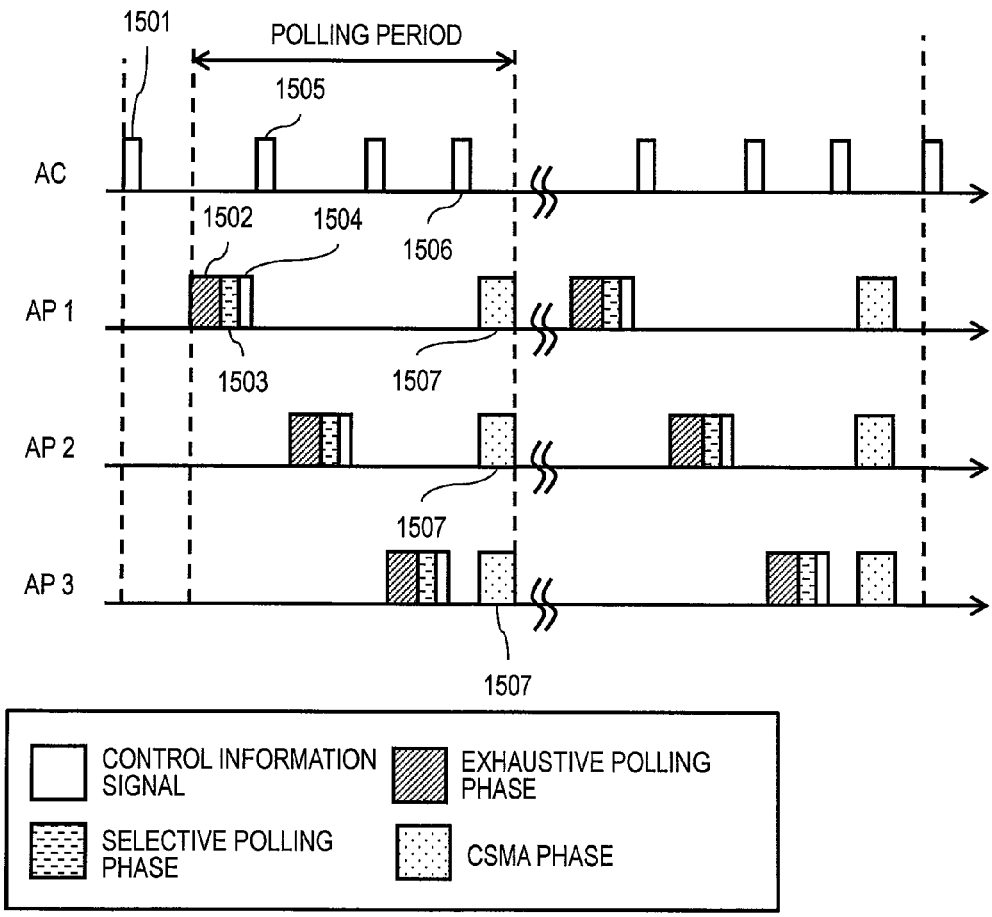
FIG. 13A is a timing chart illustrating an example of a polling timing when polling communication is performed using the wireless network illustrated in FIG. 11A in Embodiment 2.
FIG. 13B illustrates an example of a configuration of a scheduling table which indicates the polling timing during the polling communication illustrated in FIG. 13A in Embodiment 2.

FIG. 13A is a timing chart illustrating an example of a polling timing when polling communication is performed using the wireless network illustrated in FIG. 11A according to the present embodiment of the present invention.

The setting change command unit 708 of the access controller 600 transmits a polling period start signal 1501 to the synchronous process unit 815 of each of the access points 602-1 to 602-3. The table management unit 817 of each of the access points 602-1 to 602-3 updates the polling table 806 based on the scheduling setting information included in the received polling period start signal. Note the configuration and the generation method of the scheduling table 706 according to the present embodiment will be described below.

The synchronous process unit 815 of each of the access points 602-1 to 602-3 starts polling in each of the basic service sets 606-1 to 606-3 based on the information of the polling period start standard time included in the polling period start signal. In the present embodiment, a communication phase is allocated to the access points in the order of the access point 602-1, the access point 602-2, and then the access point 602-3, respectively. The communication phases are allocated to each access point 602 in the order of an exhaustive polling phase 1502, a selective polling phase 1503, and a CSMA phase 1504, respectively.

Further, the exhaustive polling phase 1502 and the selective polling phase 1503 of the access point 602 are arranged so as not to overlap with the communications phase of another access point 602. By this, while one of the wireless terminals 603 is performing polling communication with one of the access points 602 other access points 602 that are in the same coverage 607 in which the wireless terminal 603 is arranged are unable to perform polling communications. Accordingly, it becomes possible to prevent collisions between data signals during polling periods, and thereby it becomes possible to secure QoS.

When the selective polling phase 1503 of the access point 602-1 ends, the access point 602-1 transmits an end of polling phase notification signal 1504 to the access controller 600. Note when the selective polling phase 1503 ends before the time slot 202 as allocated in the polling table 806, the schedule following the transmission of the end of polling phase notification signal 1504 is advanced accordingly.

The access controller 600 receiving the end of polling phase notification signal 1504 from the access point 602-1 transmits an exhaustive polling phase start signal 1505 to the access point 602-2 for the access point 602-2 to start the exhaustive polling. The polling communications performed by the access points 602-2 and 602-3 are the same as the polling communication performed by the access point 602-1.

When the data signal process unit 710 of the access controller 600 receives the end of polling phase notification signal 1504 from the access point 602-3, the control signal process unit 709 of the access controller 600 transmits a start of CSMA phase notification signal 1506 to each of the access points 602-1 to 602-3, then the CSMA phase 1507 starts at all the basic service sets 606-1 to 606-3. Note when the selective polling phase 1503 ends earlier than the time slot 202 allocated to the selective polling phase 1503 in the polling table and the schedule following thereto is advanced accordingly, the amount of time slot 202 shortened for the selective polling phase 1503 will be added to the CSA phase 1507.

The above stated subroutine (from the start of the exhaustive polling phase 1502 at the access point 602-1 to the end of the CSMA phase 1507 at the access points 602-1 to 602-3) is repeated a predetermined number of times.

FIG. 13B illustrates an example of a configuration of a scheduling table 706c which indicates the polling timing during the polling communication illustrated in FIG. 13A. Note that the order via which the wireless terminals 603 perform polling communications according to the present embodiment is the same as the order according to Embodiment 1.

Further, the generation method of the scheduling table 706c is the same as the method described with reference to FIG. 12C, except for the followings. Since the CSMA phase 1507 starts simultaneously for all of the access points 602 at the end of the polling period, −1 is inserted in corresponding cells for all of the access points 602, and the number of slots allocated to the selective polling phase 1503 for each of the access point 602 is reduced in a manner proportion to the CSMA phase 1507.

Since the CSMA communication is simultaneously performed for all of the basic service sets 606-1 to 606-3 according to the present embodiment, the length of the polling period becomes shorter than the length of the polling period for the wireless transmission system according to Embodiment 1. Further, when the selective polling phase 1503 ends earlier than originally scheduled, the length of the CSMA phase 1507 may be extended.

According to the present embodiment, it becomes possible to, in addition to providing the effects of Embodiment 1, reduce the polling period compared with the polling period according to Embodiment 1. Further, when the selective polling phase 1503 ends earlier than scheduled and the following schedule is advance accordingly, the CSMA phase 1507 may be extended. By this, it becomes possible to reduce the packet loss rate with respect to the wireless terminal 603 which is not provided with a priority control feature without reducing the packet loss rate of the polling communications.

Embodiment 3

A wireless transmission system according to this embodiment is operable to further reduce the packet loss rate. The main difference between the wireless transmission system according to the present embodiment and the wireless transmission system according to Embodiment 1 includes that when an exhaustive polling phase in each of the basic service sets 606 ends, the wireless transmission system according to the present embodiment is operable to reschedule a selective polling phase based on data transmission status at all of the basic service sets 606 without immediately shifting to the selective polling phase.

Figures 14A, 14B, 14C:
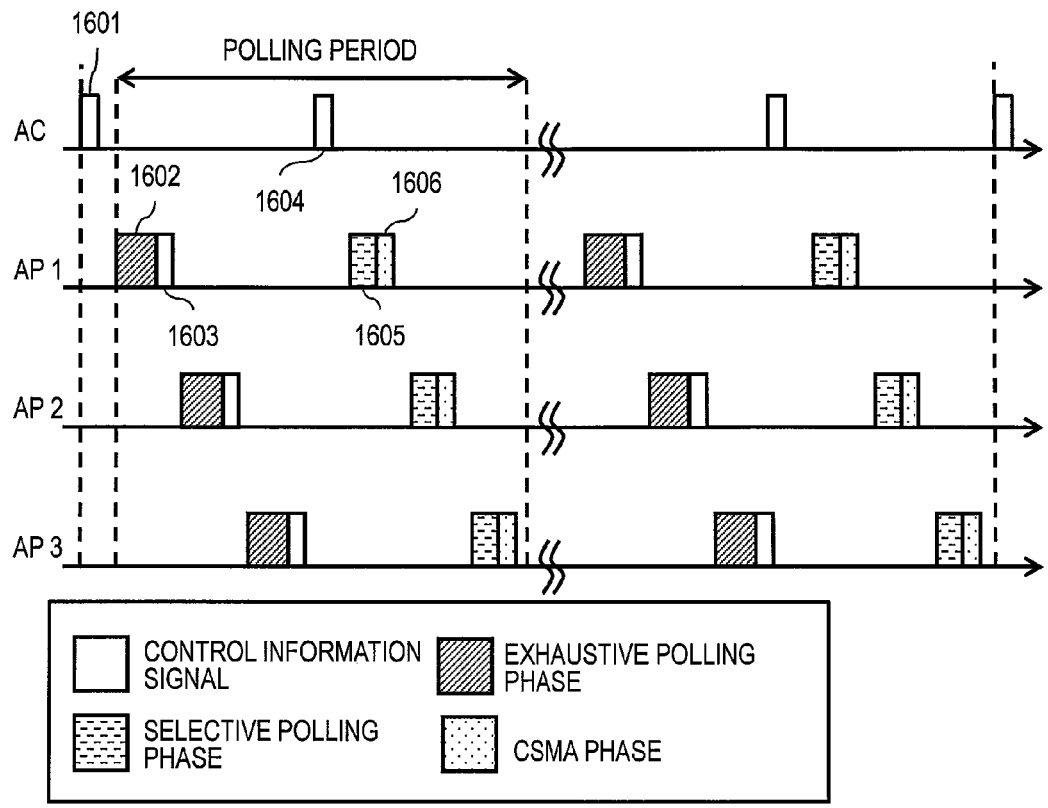
FIG. 14A is a timing chart illustrating an example of a polling timing when polling communication is performed using the wireless network illustrated in FIG. 11A in Embodiment 3.
FIG. 14B illustrates an example of a configuration of a scheduling table which indicates the polling timing during the exhaustive polling phase illustrated in FIG. 14A in Embodiment 3.
FIG. 14C illustrates an example of a configuration of the scheduling table indicating the polling timing for the selective polling phase and the CSMA phase illustrated in FIG. 14A in Embodiment 3.

FIG. 14A is a timing chart illustrating an example of a polling timing when polling communication is performed using the wireless network illustrated in FIG. 11A according to the present embodiment of the present invention.

The setting change command unit 708 of the access controller 600 transmits a polling period start signal 1601 to the synchronous process unit 815 of each of the access points 602-1 to 602-3. The table management unit 817 of each of the access points 602-1 to 602-3 updates the polling table 806 based on the scheduling setting information included in the received polling period start signal. Note the scheduling setting information only includes the information related to an exhaustive polling phase 1602. The configurations and the generation method of scheduling tables 706d and 706e according to the present embodiment will be described below.

The synchronous process unit 815 of each of the access points 602-1 to 602-3 starts polling in each of the basic service sets 606-1 to 606-3 based on the information of the polling period start standard time included in the polling period start signal.

In the present embodiment, a communication phase is allocated to the access points in the order of the access point 602-1, the access point 602-2, and then the access point 602-3, respectively. The communication phases are allocated to each access point 602 in the order of the exhaustive polling phase 1602, a selective polling phase 1605, and a CSMA phase 1606, respectively.

Further, the communication phases of the access point 602 are arranged so as not to overlap with the communication phases of another access 602. By this, while one of the wireless terminals 603 is performing polling communication or CSMA communication with one of the access points 602 other access points 602 that are in the same coverage 607 in which the wireless terminal 603 is arranged are unable to perform polling communications or CSMA communications. Accordingly, it becomes possible to prevent collisions between data signals during polling periods, and thereby it becomes possible to secure QoS.

The access point 602-1 starts the exhaustive polling phase 1602. When the exhaustive polling phase 1602 ends, the data signal unit 814 of the access point 602-1 transmits to the data signal process unit 710 of the access controller 600 an end of exhaustive polling phase notification signal 1603 including the information regarding the wireless terminal 603 that failed to perform data communication. The access points 602-2 and 602-3 perform the same operations as the access point 602-1. Note that the information regarding the wireless terminal 603 that failed to perform data communication includes the number and the identification information of the wireless terminals 603 that failed to perform the data communication, for example.

The schedule calculation unit 707 generates the scheduling table 706e for the selective polling phase 1605 and the CSMA phase 1606 based on the information received from each access point 602 regarding the result (e.g., success or failure) of data communication performed by the wireless terminal 603, while the table management unit 713 updates the scheduling table 706e. The synchronous process unit 711 of the access controller 600 generates a selective polling phase start signal 1604 including the information on the standard time when the selective polling phase 1605 starts and the information on the newly generated scheduling table 706e. The data signal process unit 710 of the access controller 600 transmits the selective polling phase start signal 1604 to each of the access points 602-1 to 602-3.

The table management unit 817 of each of the access points 602-1 to 602-3 generates the polling table 806 based on the information of the newly generated scheduling table 706e included in the received signal. The access points 602-1 to 602-3 each standby for a required period of time based on the information on the standard time to start the selective polling phase 1605 included in the received signal. The access points 602-1 to 602-3 start, based on the polling table 806, the selective polling phase 1605 in the basic service sets 606-1 to 606-3 after the required period of standby time. The above stated subroutine (from the start of the exhaustive polling phase 1602 at the access point 602-1 to the end of the CSMA phase 1606 at the access points 602-3) is repeated a predetermined number of times.

Further, although not illustrated in FIG. 14A, following examples of polling timings may be implemented. Each of the access points 602-1 to 602-3 transmits, after the selective polling phase 1605 ends, the end of polling phase notification signal to the access controller 600 instead of entering into the CSMA phase 1606. The access controller 600 transmits the end of polling phase notification signal to the access points 602-1 to 602-3 after receiving the end of polling phase notification signal, then the CSMA phase 1606 starts for all the basic service sets 606-1 to 606-3.

FIG. 14B illustrates an example of a configuration of a scheduling table 706d which indicates the polling timing during the exhaustive polling phase 1602 illustrated in FIG. 14A. Note that the order via which the wireless terminals 603 perform polling communications according to the present embodiment is the same as the order according to Embodiment 1. The schedule calculation unit 707 overwrites the cells of the scheduling table 706d for the exhaustive polling phase 1602 with the cells as illustrated in FIG. 12B. By this, the scheduling table 706d for the exhaustive polling phase 1602 is generated.

FIG. 14C illustrates an example of a configuration of the scheduling table 706e indicating the polling timing for the selective polling phase 1605 and the CSMA phase 1606 illustrated in FIG. 14A.

The schedule calculation unit 707 generates the scheduling table 706e based on the information included in the received end of exhaustive polling phase notification signal 1603 regarding the wireless terminal 603 which failed to perform data communication. For example, the numbers of slots necessary for the selective polling phase 1605 and the CSMA phase 1606 in the basic service sets 606-1 to 6063 are calculated.

For example, during the exhaustive polling phase 1602, each of the access points 602-1 to 602-3 is operable to calculate the number of necessary slots in accordance with the number of the wireless terminals 603 that failed to perform data communication. In other words, the greater the number of the wireless terminals 603 that failed to perform data communication the greater the number of time slots 202 the access points 602-1 to 602-3 allocate. By allocating time slots 202 in this manner, it becomes possible to reduce the packet loss rate.

Note in FIG. 14C, the basic service sets 606-1, 606-2, and 606-3 are allocated with 1, 2, and 3 time slots 202, respectively.

Accordingly, the schedule calculation unit 707 stores −1 indicating the selective polling phase 1605 and the CSMA phase 1606 to the scheduling table 706e in a manner corresponding to the number of slots calculated as above in the order of the access points 602-1, 602-2, and 602-3, respectively.

According to the present embodiment, the scheduling table 706e for the selective polling phase 1605 and the CSMA phase 1606 is generated based on the result of the data communications during the exhaustive polling phase 1602. Accordingly, the present embodiment is operable to further reduce the packet loss rate in addition to providing the benefits of Embodiment 1.

Embodiment 4

According to a wireless transmission system according to this embodiment, it becomes possible for multiple access points 602 to perform polling communications simultaneously so as to reduce the polling period. Further, the wireless transmission system according to the present embodiment is operable to further reduce the packet loss rate.

Figures 15A, 15B:
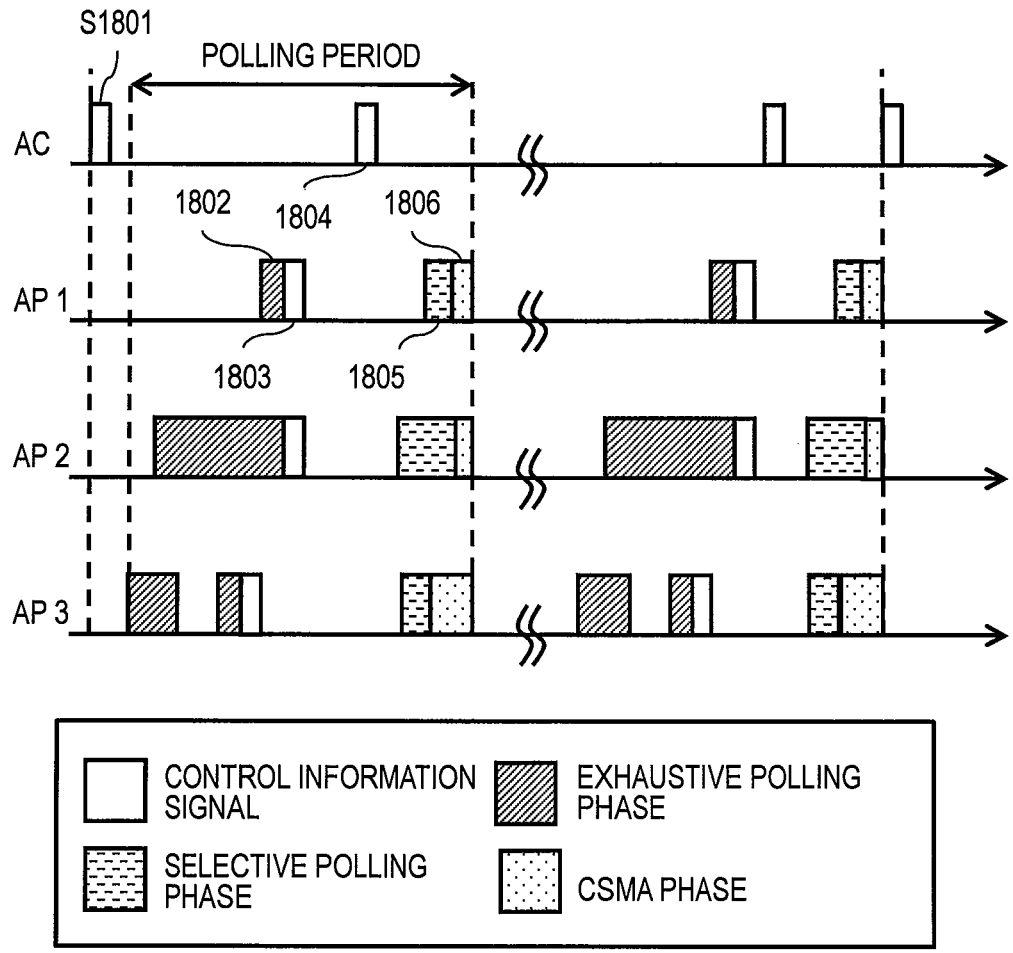
FIG. 15A is a timing chart illustrating an example of a polling timing when polling communication is performed using the wireless network illustrated in FIG. 11A in Embodiment 4.
FIG. 15B is a table illustrating a generation process of the scheduling table for the exhaustive polling phase in Embodiment 4.

FIG. 15A is a timing chart illustrating an example of a polling timing when polling communication is performed using the wireless network illustrated in FIG. 11A according to the present embodiment of the present invention.

The difference between the wireless transmission system according to the present embodiment and the wireless transmission system according to Embodiment 1 includes that multiple access points 602 simultaneously perform polling communications in a manner note allowing collisions of data signals, and that rescheduling is performed after the exhaustive polling phase in the same manner as in Embodiment 3.

The setting change command unit 708 of the access controller 600 transmits a polling period start signal 1801 to the synchronous process unit 815 of each of the access points 602-1 to 602-3. The table management unit 817 of each of the access points 602-1 to 602-3 updates the polling table 806 based on the scheduling setting information included in the received polling period start signal 1801. Note the configurations and the generation method of scheduling tables 706*f* and 706*g* according to the present embodiment will be described below.

The synchronous process unit 815 of each of the access points 602-1 to 602-3 starts polling in each of the basic service sets 606-1 to 606-3 based on the information of the polling period start standard time included in the polling period start signal 1801.

In the present embodiment, communication phases of the access points 602 may overlap with one another. However, while one of the wireless terminals 603 is performing polling communication with the access point 602, other access points 602 arranged in the coverage 607, in which the wireless terminal 602 is arranged, do not to perform polling communications simultaneously.

The communication phases according to the present embodiment are allocated to each access point 602 in the order of an exhaustive polling phase 1802, a selective polling phase 1805, and a CSMA phase 1806, respectively.

The access point 602-1 starts the exhaustive polling phase 1802. When the exhaustive polling phase 1802 ends, the data signal unit 814 of the access point 602-1 transmits to the data signal process unit 710 of the access controller 600 an end of exhaustive polling phase notification signal 1803 including the information regarding the wireless terminal 603 that failed to perform data communication. The access points 602-2 and 602-3 perform the same operations as the access point 602-1. Note that the information regarding the wireless terminal 603 that failed to perform data communication includes the number and the identification information of the wireless terminals 603 that failed to perform the data communication, for example.

The schedule calculation unit 707 generates the scheduling table 706*g* for the selective polling phase 1805 and the CSMA phase 1806 based on the information, which is received from each access point 602 and included in the end of exhaustive polling phase notification signal 1803, regarding the result (e.g., success or failure) of data communication performed by the wireless terminal 603. The table management unit 713 updates the scheduling table 706*g*. The synchronous process unit 711 of the access controller 600 generates a selective polling phase start signal 1804 including the information on the standard time when the selective polling phase 1805 starts and the information on the newly generated scheduling table 706*g*. The data signal process unit 710 of the access controller 600 transmits the selective polling phase start signal 1804 to each of the access points 602-1 to 602-3.

The table management unit 817 of each of the access points 602-1 to 602-3 generates the polling table 806 based on the information of the newly generated scheduling table 706*g* included in the received selective polling phase start signal 1804. The access points 602-1 to 602-3 each standby for a required period of time based on the information on the standard time to start the selective polling phase 1805 included in the received selective polling phase start signal 1804.

The access points 602-1 to 602-3 start, based on the polling table 806, the selective polling phase 1805 in the basic service sets 606-1 to 606-3 after the required period of standby time. Each of the access points 602-1 to 602-3 starts the CSMA phase 1806 after the selective polling phase 1805 ends. The above stated subroutine (from the start of the exhaustive polling phase 1802 at the access point 602 to the end of the CSMA phase at all of the access points 602-1 to 602-3) is repeated a predetermined number of times.

Hereinafter, an example of a generation method of the scheduling tables 706*f* and 706*g* for the exhaustive polling phase according to the present embodiment will be described with reference to FIG. 15B to FIG. 15E.

FIG. 15B is a table illustrating a generation process of the scheduling table 706*f* for the exhaustive polling phase. This table is generated by adding a row indicating the sum of a corresponding particular column to the all AP collision table 704*b* illustrated in FIG. 11B. In other words, the sum is arranged to store therein the number of the coverage 607 of the access point 602 in which the corresponding wireless terminal 603 is arranged.

FIG. 15C is a table illustrating a generation process of the scheduling table 706*f* for the exhaustive polling phase. This table is generated by sorting the table illustrated in FIG. 15B in the descending order of the sum. After this table is generated, pairs of the wireless terminals 603 whose data signals will not collide when the wireless terminals 603 perform polling communications simultaneously are generated. That is to say, one wireless terminal 603 is paired with another wireless terminal 603 where there is no overlapping of the coverage 607 therebetween. Hereinafter, an example of a generation method of such pairs will be described.

The wireless terminals 603 are paired starting with the wireless terminal 603 that is on the left hand side of the table (where the sum value is greater). Firstly, the wireless terminal 603-9 will be performing polling communications independently since when this terminal that is arranged within all of the coverages 607-1 to 607-3 performs polling communications simultaneously with another wireless terminal 603 their data signals will be collided.

Next, since the wireless terminal 603-2 is arranged within the coverages 607-1 and 607-2, the wireless terminal 603-2 may be paired with the wireless terminal 603 arranged only within the coverage 607-3. Because only the wireless terminal 603-7 meets such condition, the wireless terminal 603-2 and the wireless terminal 603-7 are paired with one another.

Next, since the wireless terminal 603-3 is arranged within the coverages 607-1 and 607-2, the wireless terminal 603-3 may be paired with wireless terminals 603 that are arranged only within the coverage 607-3. Although only the wireless terminal 603-7 meets such condition, since the wireless terminal 603-7 is paired with the wireless terminal 603-2, the wireless terminal 603-3 will be performing polling communications independently. In the same manner, the wireless terminal 603-8 will be paired with the wireless terminal 603-4; and the wireless terminal 603-6 will be paired with the wireless terminal 603-1.

FIG. 15D illustrates an example of a configuration of the scheduling table 706*f* for the exhaustive polling phase 1802 according to the present embodiment. The scheduling table 706*f* is generated by sequentially allocating the time slot 202 to each of the pairs of the wireless terminals 603 that are generated via FIG. 15C, and allocating each wireless terminal 603 to the access point 602 associated with the wireless terminal 603 by referring to the all AP association table 705*b*.

FIG. 15E illustrates an example of a configuration of the scheduling table 706*g* indicating the polling timing for the selective polling phase 1805 and the CSMA phase 1806 according to the present embodiment. The scheduling table 706g according to the present embodiment stores the identification information which uniquely identifies each wireless terminal 603 in a corresponding cell when the time slot 202 is allocated to the selective polling phase 1805. When the time slot 202 is allocated to the CSMA phase 1806, the scheduling table 706g stores −1 in corresponding cells.

FIG. 15E illustrates an example of a case when the wireless terminals 603-5, 603-6, and 603-8 fail to perform data transmission during the exhaustive polling phase 1802. Note that the generation method of the scheduling table 706g is the same as the generation method of the scheduling table 706f.

For example, a table similar to what is described above is generated exclusively for the wireless terminals 603-5, 603-6, and 603-8. Next, a column may be added next to the column for the last time slot 202 for the selective polling phase 1805, and then −1 is inserted therein to indicate the CSMA phase 1806 for all of the access points 602-1 to 602-3 as necessary.

Embodiment 5

According to this present embodiment, it becomes possible to reduce the polling period by allowing multiple access points 602 to perform polling communications simultaneously.

A wireless transmission system according to the present embodiment includes an access point that is implemented with the features of the access controller in the wireless transmission system according to Embodiment 1. Note that the description of a portion of the configuration for the present embodiment identical to the configuration for Embodiment 1 will be omitted.

The difference between the wireless transmission system according to the present embodiment and the wireless transmission system according to Embodiment 1 includes that the wireless transmission system according to the present embodiment eliminates the access controller 600 by implementing one of the access points, 602-1, with the features of the access controller so as to create an access controller/access point 1700.

Figure 16:
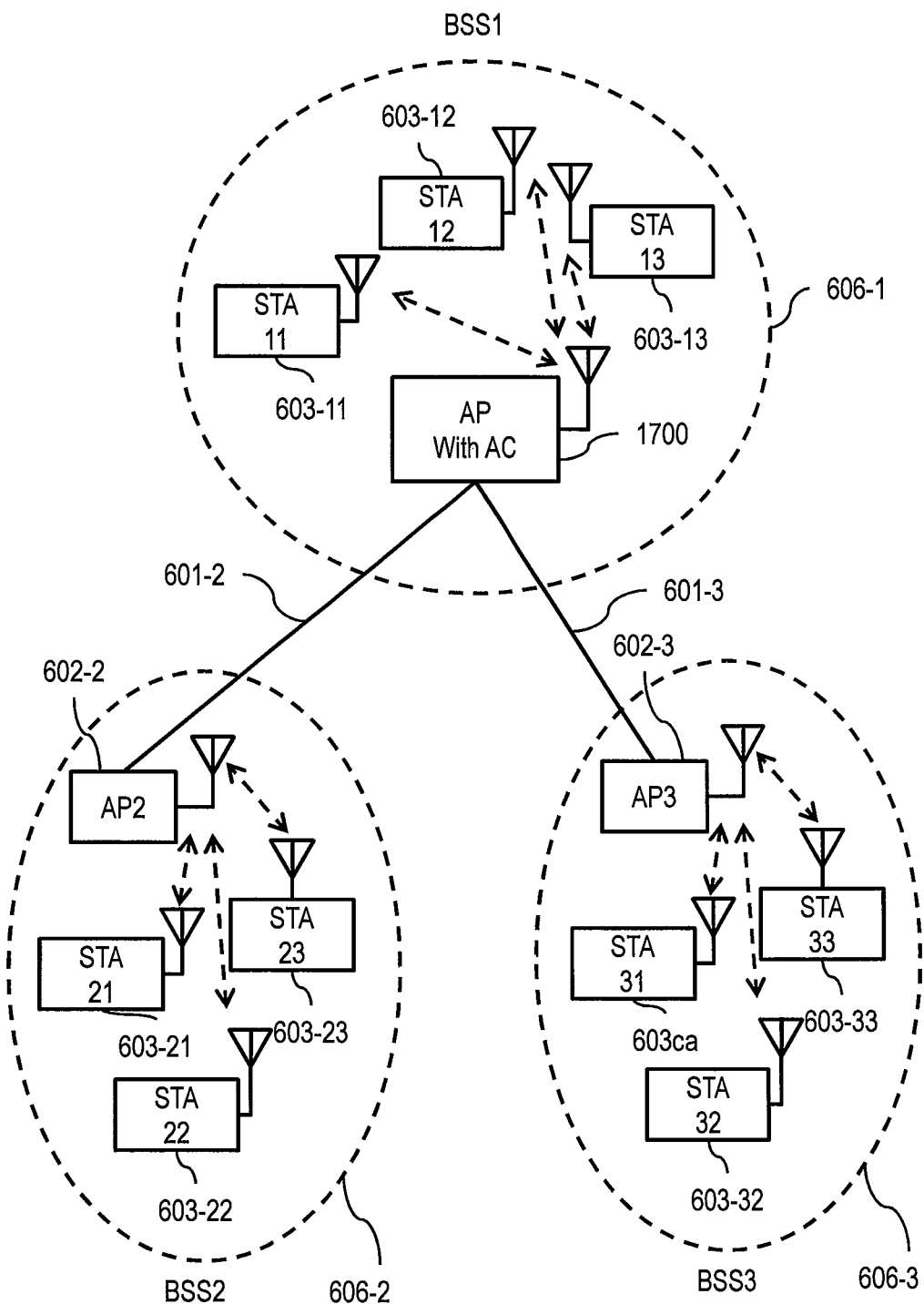
FIG. 16 illustrates an example of an outline of the wireless transmission system in Embodiment 5.

FIG. 16 illustrates an example of an outline of the wireless transmission system according to the present embodiment. The wireless transmission system according to the present embodiment includes the access controller/access point 1700, the wired cables 601-1 to 601-3, the access points 602-1 to 602-3, and the wireless terminals 603-11 to 603-13, 603-21 to 603-23, and 603-31 to 603-33.

The access controller/access point 1700 is connected to the access points 602-2 and 602-3 via the wired cables 601-2 and 601-3, respectively, so as to communicate with one another. The access controller/access point 1700 is connected to the wireless terminals 603-11 to 603-13; the access point 602-2 is connected to the wireless terminals 603-21 to 603-23; and the access point 602-3 is connected to the wireless terminals 603-31 to 603-33 so as to allow communications via wireless signals therebetween, respectively.

Note that the configuration of the access controller/access point 1700 includes the configurations which were described with reference to FIG. 2 and FIG. 3. According to the present embodiment, the access controller/access point 1700 performs the operations carried out by the access controller 600 and one of the access points 602 according to Embodiment 1. Note the number of the access controller/access point 1700, the wired cable 601, the access point 602, and the wireless terminal 603 may not be limited in any way, provided that the features of the wireless transmission system according to the present embodiment are realized.

According to the present embodiment, it becomes possible to, in addition to providing the effects of Embodiment 1, reduce the introduction cost for the wireless transmission system by implementing the features of the access controller 600 on the access point 602.

Embodiment 6

A wireless transmission system according to the present embodiment includes the wireless transmission system according to Embodiment 1 in which the access controller and each of the access points are connected to one another in a wireless manner. Note that the description of a portion of the configuration for the present embodiment identical to the configuration for Embodiment 1 will be omitted.

The difference between the wireless transmission system according to the present embodiment and the wireless transmission system according to Embodiment 1 includes that the wireless transmission system according to the present embodiment eliminates the wired cables 601-1 to 601-3 and the access controller 600 is connected to each of the access points 602-1 to 602-3 in a wireless manner via wireless signals.

Figure 17:
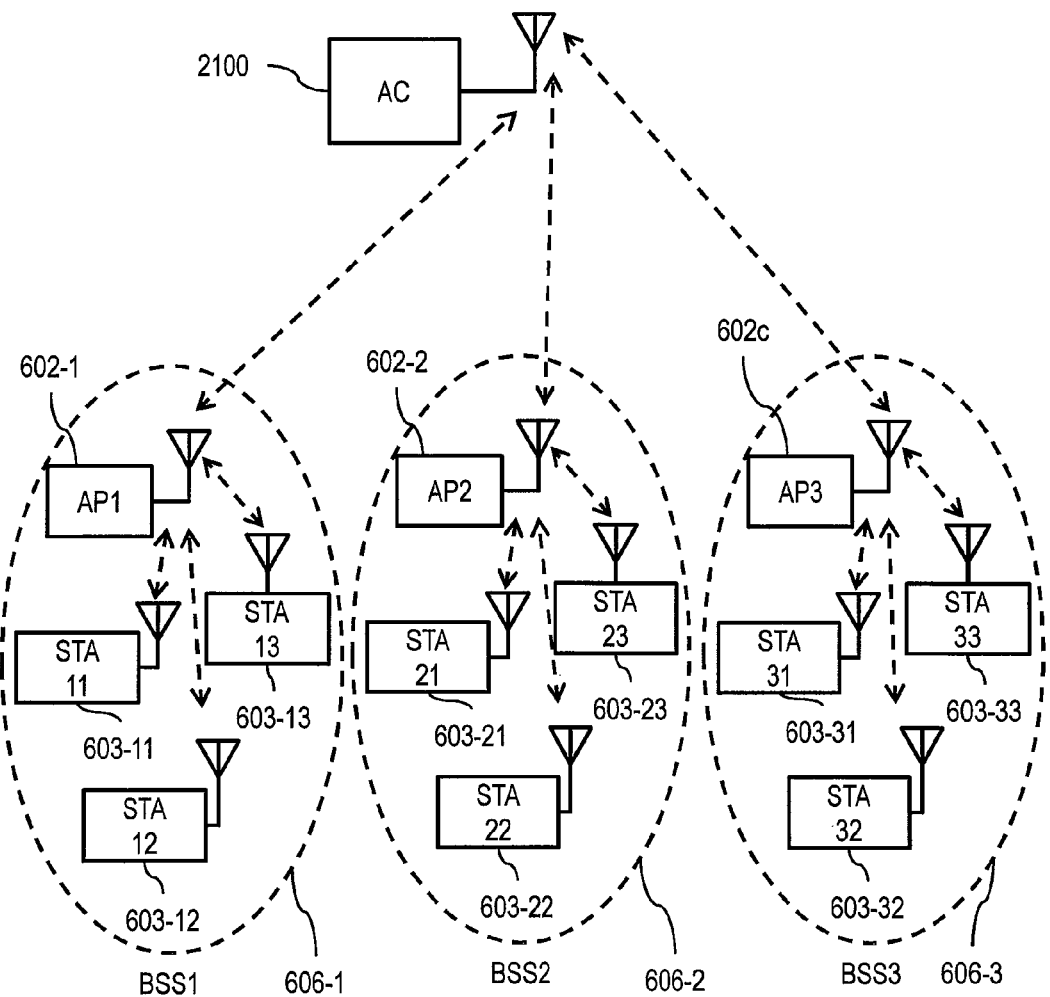
FIG. 17 illustrates an example of an outline of the wireless transmission system in Embodiment 6.

FIG. 17 illustrates an example of an outline of the wireless transmission system according to the present embodiment. The wireless transmission system according to the present embodiment includes the access controller 600, the access points 602-1 to 602-3, and the wireless terminals 603-11 to 603-13, 603-21 to 603-23, and 603-31 to 603-33.

The access controller 600 and an access point 602-k (k is an arbitrary number from 1 to 3) communicate with one another via wireless signals. The access point 602-k and a wireless terminal 603-kl (l is an arbitrary number from 1 to 3) communicate with one another via wireless signals.

Note in the present embodiment the interface 904 of the access controller 600 communicates with each access point 602 via wireless signals. Further, note the number of the access controller 600, the wired cable 601, the access point 602, and the wireless terminal 603 may not be limited in any way, provided that the features of the wireless transmission system according to the present embodiment are realized.

According to the present embodiment it becomes possible to, in addition to providing the effects of Embodiment 1, arrange the access controller 600 and each access point 602 in a convenient manner since the access controller 600 and each access point 602 are connected to one another wirelessly.

Embodiment 7

A wireless transmission system according to this embodiment includes the wireless transmission system according to Embodiment 1 with an access point having the features of an access controller, and the access controller/access point connected to each access point in a wireless manner wherein the access controller/access point communicates with each access point via wireless signals. Note that the description of a portion of the configuration for the present embodiment identical to the configuration for Embodiment 1 will be omitted.

The difference between the wireless transmission system according to the present embodiment and the wireless transmission system according to Embodiment 1 includes two following aspects. First, the present embodiment eliminates the access controller 600 and includes the access controller/access point 1700, which is the access point 602-1 having the features of the access controller 600. Second, the present embodiment eliminates the wired cables 601-1 to 601-3 by allowing the access controller/access point 1700 to communicate with each of the access points 602-2 to 602-3 in a wireless manner via wireless signals.

Figure 18:
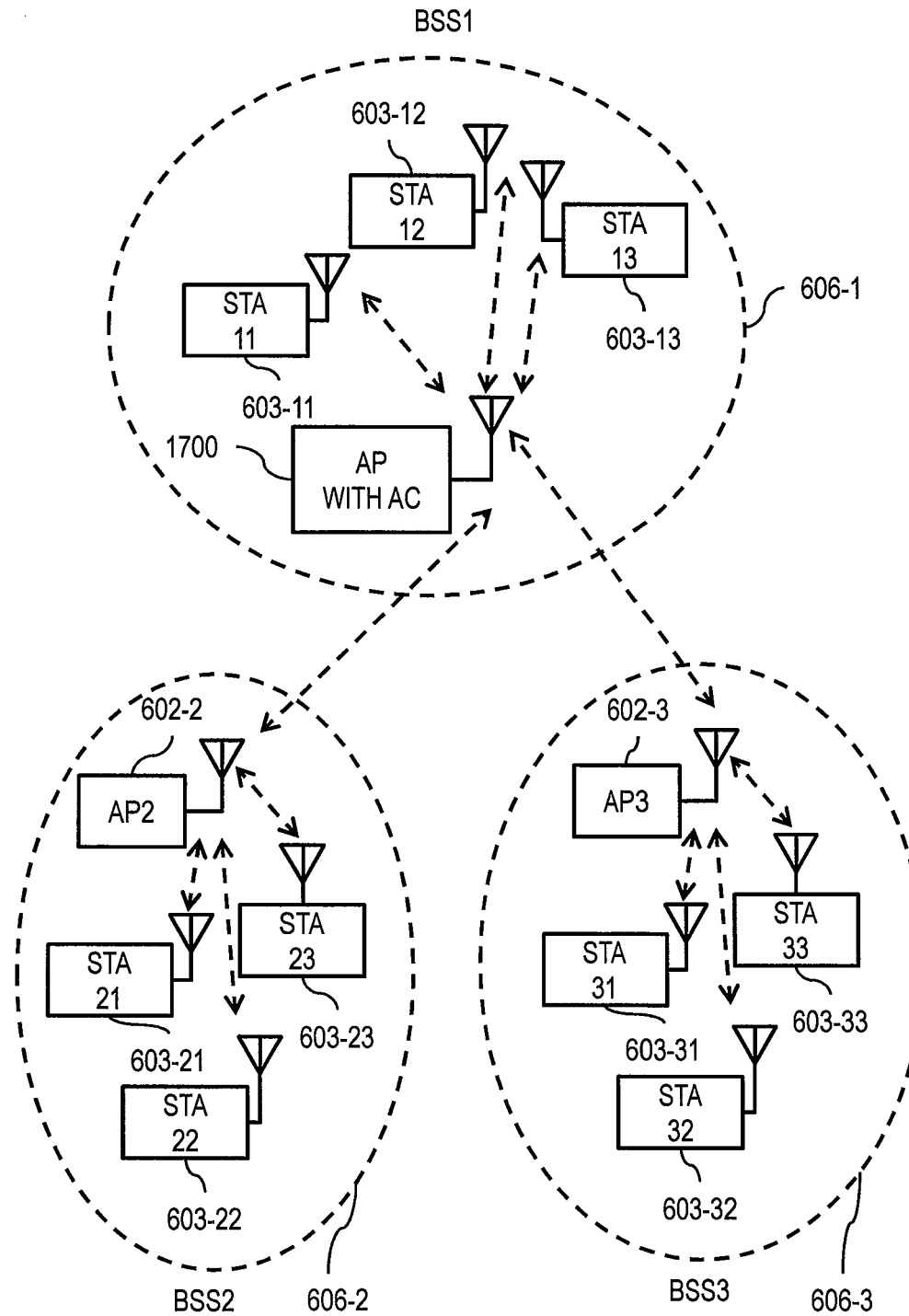
FIG. 18 illustrates an example of an outline of the wireless transmission system in Embodiment 7.

FIG. 18 illustrates an example of an outline of the wireless transmission system according to the present embodiment. The wireless transmission system according to the present embodiment includes the access controller/access point 1700, the access points 602-1 to 602-3, and the wireless terminals 603-11 to 603-13, 603-21 to 603-23, and 603-31 to 603-33.

The access controller/access point 1700 and each of the access point 602-2 and 602-3 communicate with one another via wireless signals. The access controller/access point 1700 communicates via wireless signals with the wireless terminals 603-11 to 603-13; the access point 602-2 communicates via wireless signals with the wireless terminals 603-21 to 603-23; and the access point 602-3 communicates via wireless signals with the wireless terminals 603-31 to 603-33, respectively.

Note that the configuration of the access controller/access point 1700 includes the configurations which were described with reference to FIG. 2 and FIG. 3. Further, the interface 904 of the access controller/access point 1700 communicates with each access point 602 via wireless signals. According to the present embodiment the access controller/access point 1700 performs the operations carried out by the access controller 600 and one of the access points 602 according to Embodiment 1. Note the number of the access controller/access point 1700, the access point 602, and the wireless terminal 603 may not be limited in any way, provided that the features of the wireless transmission system according to the present embodiment are realized.

According to the present embodiment, it becomes possible to, in addition to providing the effects of Embodiment 1, reduce the introduction cost for the wireless transmission system by implementing the features of the access controller 600 on the access point 602. Further, since the access controller/access point 1700 and each access point 602 are connected to one another wirelessly, it becomes possible to arrange the access controller/access point 1700 and each access point 602 in a convenient manner.

Embodiment 8

This embodiment includes a wireless video transmission system which includes the wireless transmission system according to Embodiment 1 applied to a wireless monitoring camera system.

Figure 19:
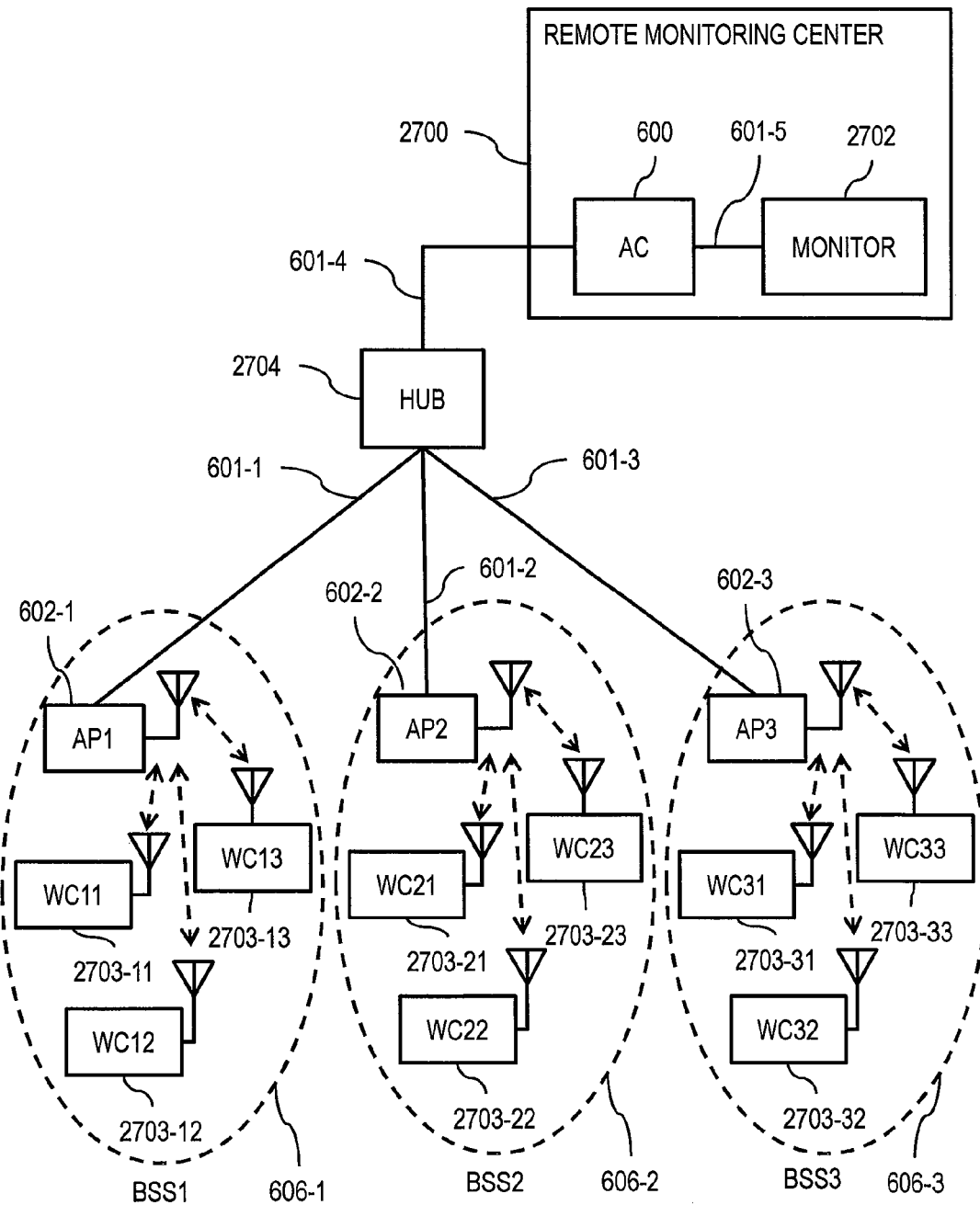
FIG. 19 illustrates an example of an outline of the wireless video transmission system in Embodiment 8.

FIG. 19 illustrates an example of an outline of the wireless video transmission system according to the present embodiment. The wireless video transmission system according to the present embodiment includes a remote monitoring center 2700, the wired cables 601-1 to 601-5, a hub 2704, the access points 602-1 to 602-3, and wireless camera terminals (WC) 2703-11 to 2703-13, 2703-21 to 2703-23, and 2703-31 to 2703-33.

The remote monitoring center 2700 includes the access controller 600 and a monitor 2702. The access controller 600 is connected to the monitor 2702 via the wired cable 601-5. Further, the access controller 600 is connected to the hub 2704 via the wired cable 601-4. Further, the hub 2704 is connected to an access point 602-k via a wired cable 601-k (k is an arbitrary number between 1 to 3). The access point 602-k is connected to a wireless camera terminal 2703-k1 (1 is an arbitrary number from 1 to 3) via wireless signals.

Note the number of the access controller 600, the wired cable 601, the access point 602, the monitor 2702, the wireless camera terminal 2703, and the hub 2704 may not be limited in any way, provided that the features of the wireless video transmission system according to the present embodiment are realized. Note portions of the present embodiment that are wire-connected may be wirelessly connected. Further, any of the access points 602 according to the present embodiment may be substituted with the access controller/access point 1700.

According to the present embodiment, it becomes possible to, in addition to providing the effects of Embodiment 1, have the access point 602 arranged outdoors such as busy areas of a town, or the like, or arranged indoors such as the inside of an office building, thereby easily expanding an area corresponding to a wireless camera system without disturbances or discontinuation of video signals.

The present invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A wireless transmission system comprising:
a plurality of access points configured to communicate with a plurality of wireless terminals connected within a plurality of wireless coverage areas to the plurality of access points; and
an access controller configured to communicate with the plurality of access points,
wherein each of the access points retains first information indicating which of the wireless terminals are located in a corresponding one of the wireless coverage areas of the access points, and second information indicating which of the wireless terminals are connected with the corresponding access point within the corresponding one of the wireless coverage areas,
wherein each of the access points transmits updated information of the first information and the second information to the access controller,
wherein the access controller retains third information indicating correlations between each of the access points and which of the wireless terminals are located in the corresponding one of the wireless coverage areas of each of the access points, and fourth information indicating correlations between each of the access points and which of the wireless terminals are connected with each of the access points within the corresponding wireless coverage areas thereof,
wherein the access controller updates the third information and the fourth information based on the updated information received from the access points, wherein the access controller determines a start standard time for a polling period for each of the access points to perform polling communication with the wireless terminals, wherein the access controller generates a scheduling setting information indicating timings when the access points are to perform polling communication with the wireless terminals during the polling period based on the updated third information and updated fourth information, wherein the access controller transmits, to each of the access points, a polling period start signal including the start standard time and a corresponding portion of the scheduling setting information for each of the access points, wherein each of the access points performs a non-overlapping communication phase over separate time periods with the wireless terminals including a polling communication phase where data is received from at least one of the wireless terminals connected to the corresponding one of the access points followed by a CSMA communication phase after the non-overlapping polling communication phase where data is received from at least one of the wireless terminals connected to the corresponding one of the access points based on the polling period start signal and the corresponding portion of the scheduling setting information, wherein each of the polling communication phases includes an exhaustive polling phase in which polling communication is performed separately and individually with all of the wireless terminals connected to the corresponding one of the access points and data is received from at least one of the wireless terminals connected to the corresponding one of the access points, and a selective polling phase in which polling communication is performed with one or more of the wireless terminals that failed to communicate data during the exhaustive polling phase and data is received from at least one of the wireless terminals that failed to communicate data during the exhaustive polling phase, and wherein the access controller determines a length of the exhaustive polling phase based on a number of wireless terminals connected with the corresponding one of the access points.

2. The wireless transmission system according to claim 1, wherein the scheduling setting information regulates the communication phase which includes an exhaustive polling phase for each of the access points to perform non-overlapping polling communication with all of the wireless terminals wirelessly connected during the polling period, and wherein the access controller receives, from each of the access points, an exhaustive polling phase end notice indicating a number of wireless terminals which failed communication during the exhaustive polling phase, wherein the access controller generates second scheduling setting information after receiving the exhaustive polling phase end notices from all of the access points, wherein the second scheduling setting information regulates the communication phase which includes a selective polling phase for each of the access points to perform non-overlapping polling communication with the wireless terminals which failed communication during the respective exhaustive polling phase, wherein the access controller determines the selective polling phase based on the number of the wireless terminals which failed the communication during the exhaustive polling phase indicated in the end notification, wherein the access controller transmits, to each of the access points, a selective polling phase start signal including a corresponding portion of the second scheduling setting information for each of the access points, and wherein each of the access points performs non-overlapping selective polling communication based on the received selective polling phase start signal.

3. The wireless transmission system according to claim 1, wherein the scheduling setting information regulates the communication phase which includes an exhaustive polling phase for each of the access points to perform communication separately and individually with all of the connected wireless terminals during the polling period, wherein, during the exhaustive polling phases of the access points, when one wireless terminal is performing polling communication with one of the access points, other wireless terminals of the access points which are located in a coverage area of the wireless terminal performing the polling communication are prohibited from performing polling communication.

4. A method to control a plurality of access points configured to communicate with a plurality of wireless terminals connected within a plurality of wireless coverage areas to the plurality of access points, wherein each of the access points retains first information indicating which of the wireless terminals are located in a corresponding one of the coverage areas of the access points, and second information indicating which of the wireless terminals are connected with the corresponding access point within the corresponding one of the wireless coverage areas, the method comprising:

receiving updated information of the first information and the second information to the access controller from each of the access points;

updating, based on the updated information received from the access points, third information indicating correlations between each of the access points and which of the wireless terminals are located in the corresponding one of the wireless coverage areas of each of the access points, and fourth information indicating correlations between each of the access points and which of the wireless terminals are connected with each of the access points within the corresponding wireless coverage areas thereof;

determining a start standard time for a polling period for each of the access points to perform polling communication with the wireless terminals;

generating a scheduling setting information indicating timings when the access points are to perform polling communication with the wireless terminals during the polling period based on the updated third information and updated fourth information;

transmitting, to each of the access points, a polling period start signal including the start standard time and a corresponding portion of the scheduling setting information for each of the access points; and performing, by each of the access points, a non-overlapping communication phase over separate time periods with the wireless terminals including a non-overlapping polling communication phase where data is received from at least one of the wireless terminals connected to the corresponding one of the access points followed by a CSMA communication phase after the non-overlapping polling communication phase where data is received from at least one of the wireless terminals connected to the corresponding one of the access points based on the polling period start signal and the corresponding portion of the scheduling setting information, wherein each of the polling communication phases includes an exhaustive polling phase in which polling communication is performed separately and individually with all of the wireless terminals connected to the corresponding one of the access points and data is received from at least one of the wireless terminals connected to the corresponding one of the access points, and a selective polling phase in which polling communication is performed with one or more of the wireless terminals that failed to communicate data during the exhaustive polling phase and data is received from at least one of the wireless terminals that failed to communicate data during the exhaustive polling phase, and wherein the method further comprises determining a length of the exhaustive polling phase based on a number of wireless terminals connected with the corresponding one of the access points.

5. The method according to claim 4, wherein the scheduling setting information regulates the communication phase which includes an exhaustive polling phase for each of the access points to perform non-overlapping polling communication with all of wirelessly connected wireless terminal during the polling period, the method further comprising:
receiving, from each of the access points, an exhaustive polling phase end notice indicating the number of wireless terminals which failed communication during the exhaustive polling phase,
generating second scheduling setting information after receiving the exhaustive polling phase end notices from all of the access points, the second scheduling setting information regulating a selective polling phase for each of the access points to perform non-overlapping polling communication with wireless terminals which failed communication during the respective exhaustive polling phase;
determining the selective polling phase based on the number of wireless terminals which failed the communication during the exhaustive polling phase indicated in the end notification;
transmitting, to each of the access points, a selective polling phase start signal including a corresponding portion of the second scheduling setting information for each of the access points in the second scheduling setting information.

6. The method according to claim 4, wherein the scheduling setting information regulates the communication phase which includes an exhaustive polling phase for each of the access points to perform communication separately and individually with all of the connected wireless terminals during the polling period,
wherein, during the exhaustive polling phases of the access points, when one wireless terminal is performing polling communication with one of the access points, other wireless terminals of the access points which are located in a coverage area of the wireless terminal performing the polling communication are prohibited from performing polling communication.

7. A wireless transmission system comprising:
a plurality of access points configured to communicate with a plurality of wireless terminals connected within a plurality of wireless coverage areas to the plurality of access points; and
an access controller configured to communicate with the plurality of access points,
wherein each of the access points retains first information indicating which of the wireless terminals are located in a corresponding one of the wireless coverage areas of the access points, and second information indicating which of the wireless terminals are connected with the corresponding access point within the corresponding one of the wireless coverage areas,
wherein each of the access points transmits updated information of the first information and the second information to the access controller,
wherein the access controller retains third information indicating correlations between each of the access points and which of the wireless terminals are located in the corresponding one of the wireless coverage areas of each of the access points, and fourth information indicating correlations between each of the access points and which of the wireless terminals are connected with each of the access points within the corresponding wireless coverage areas thereof,
wherein the access controller updates the third information and the fourth information based on the updated information received from the access points,
wherein the access controller determines a start standard time for a polling period for each of the access points to perform polling communication with the wireless terminals,
wherein the access controller generates a scheduling setting information indicating timings when the access points are to perform polling communication with the wireless terminals during the polling period based on the updated third information and updated fourth information,
wherein the access controller transmits, to each of the access points, a polling period start signal including the start standard time and a corresponding portion of the scheduling setting information for each of the access points,
wherein each of the access points separately performs a communication phase over separate time periods with the wireless terminals including a non-overlapping polling communication phase over separate time periods with the wireless terminals where data is received from at least one of the wireless terminals followed by a CSMA communication phase where data is received from at least one of the wireless terminals after the non-overlapping polling communication phase based on the polling period start signal and the corresponding portion of the scheduling setting information,
wherein the CSMA phases of all of the access points are scheduled to coincide with one another,
wherein each of the polling communication phases includes an exhaustive polling phase in which polling communication is performed separately and individually with all of the wireless terminals connected to the corresponding one of the access points and data is received from at least one of the wireless terminals connected to the corresponding one of the access points, and a selective polling phase in which polling communication is performed with one or more of the wireless terminals that failed to communicate data during the exhaustive polling phase and data is received from at least one of the wireless terminals that failed to communicate data during the exhaustive polling phase, and wherein the access controller determines a length of the exhaustive polling phase based on a number of wireless terminals connected with the corresponding one of the access points.

8. The wireless transmission system according to claim 7, wherein the access points separately transmit polling phase end notices to the access controller, and wherein the access controller instructs all of the access points to start the CSMA phase in response to receiving a last one of the polling phase end notices.

\* \* \* \* \*